(12) United States Patent
Lee

(10) Patent No.: US 8,845,860 B2
(45) Date of Patent: Sep. 30, 2014

(54) HIGH BRIGHTNESS PULPS FROM LIGNIN RICH WASTE PAPERS

(75) Inventor: Jeffrey A. Lee, Neenah, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 21 days.

(21) Appl. No.: 13/222,069

(22) Filed: Aug. 31, 2011

(65) Prior Publication Data

US 2012/0067532 A1  Mar. 22, 2012

Related U.S. Application Data

(60) Provisional application No. 61/403,466, filed on Sep. 16, 2010.

(51) Int. Cl.
| | |
|---|---|
| *D21C 9/16* | (2006.01) |
| *D21C 5/02* | (2006.01) |
| *D21C 9/10* | (2006.01) |

(52) U.S. Cl.
CPC ............... *D21C 5/022* (2013.01); *D21C 9/163* (2013.01); *D21C 9/1057* (2013.01)
USPC .......................................................... 162/5

(58) Field of Classification Search
CPC ....... D21C 5/022; D21C 9/1057; D21C 9/163
USPC .......................................................... 162/5
See application file for complete search history.

(56) References Cited

U.S. PATENT DOCUMENTS

| | | |
|---|---|---|
| 3,193,445 A | 7/1965 | Parker et al. |
| 3,695,995 A | 10/1972 | Roymoulik |
| 3,720,577 A | 3/1973 | Roymoulik |
| 3,867,246 A | 2/1975 | Hebbel et al. |
| 4,187,141 A | 2/1980 | Ahrel |
| 4,283,302 A | 8/1981 | Foret et al. |
| 4,338,210 A | 7/1982 | Clements et al. |
| 4,372,812 A | 2/1983 | Phillips et al. |
| 4,400,237 A | 8/1983 | Kruger et al. |
| 4,548,674 A | 10/1985 | Hageman et al. |
| 4,756,798 A | 7/1988 | Lachenal et al. |
| 4,938,889 A | 7/1990 | Wilsberg et al. |

(Continued)

FOREIGN PATENT DOCUMENTS

| | | |
|---|---|---|
| EP | 0148712 B1 | 9/1987 |
| EP | 0456032 A1 | 11/1991 |

(Continued)

OTHER PUBLICATIONS

Forsberg et al, Bleaching mixed office waste to high brightness. vol. 77, No. 3 Tappi Journal pp. 253-260.*

(Continued)

*Primary Examiner* — Jacob Thomas Minskey
(74) *Attorney, Agent, or Firm* — Laura L. Bozek

(57) ABSTRACT

This present invention relates to methods for preparing premium or near-premium brightness pulps for towel and tissue applications from fiber sources comprising substantial amounts of lignin-containing pulp and chemical pulp while controlling fines, scale and anionic trash. These methods use alkaline hydroxide in combination with peroxide and oxygen for initial bleaching stages followed by treatment with a peroxide activating agent to convert residual peroxide in the pulp into peracetic acid followed by a final reductive bleaching stage.

10 Claims, 5 Drawing Sheets

(56) References Cited

U.S. PATENT DOCUMENTS

| | | |
|---|---|---|
| 5,223,091 A | 6/1993 | Hetzler et al. |
| 5,264,001 A | 11/1993 | Arifoglu et al. |
| 5,296,100 A | 3/1994 | Devic |
| 5,387,317 A | 2/1995 | Parthasarathy et al. |
| 5,478,357 A | 12/1995 | Madison et al. |
| 5,589,032 A | 12/1996 | Chang et al. |
| 5,645,686 A | 7/1997 | Troughton et al. |
| 5,693,185 A | 12/1997 | Chang et al. |
| 5,733,412 A | 3/1998 | Markham et al. |
| 5,833,864 A | 11/1998 | Miller et al. |
| 6,056,853 A | 5/2000 | Vincent et al. |
| 6,080,710 A | 6/2000 | Withenshaw et al. |
| 6,221,209 B1 | 4/2001 | Desprez et al. |
| 6,225,276 B1 | 5/2001 | Gassenmeier et al. |
| 6,524,437 B1 | 2/2003 | Vincent et al. |
| 6,569,286 B1 | 5/2003 | Withenshaw et al. |
| 6,632,328 B2 | 10/2003 | Wan et al. |
| 6,743,332 B2 | 6/2004 | Haynes et al. |
| 6,866,749 B2 | 3/2005 | Delmas et al. |
| 6,881,299 B2 | 4/2005 | Parrish et al. |
| 7,001,484 B2 | 2/2006 | Ni et al. |
| 7,052,578 B2 | 5/2006 | Wajer et al. |
| 7,163,564 B2 | 1/2007 | Sibiet et al. |
| 7,297,225 B2 | 11/2007 | Thomas et al. |
| 7,384,502 B2 | 6/2008 | Kamijo et al. |
| 2001/0050153 A1 | 12/2001 | Wajer et al. |
| 2004/0112557 A1* | 6/2004 | Parrish et al. .................. 162/78 |
| 2006/0081346 A1 | 4/2006 | Ni et al. |
| 2008/0087390 A1* | 4/2008 | Lee et al. ......................... 162/4 |

FOREIGN PATENT DOCUMENTS

| | | |
|---|---|---|
| WO | 96/41917 A1 | 12/1996 |
| WO | 01/55502 A1 | 8/2001 |
| WO | 02/052101 A1 | 7/2002 |
| WO | 2009/050336 A1 | 4/2009 |
| WO | 2010049591 A1 | 5/2010 |

OTHER PUBLICATIONS

David F. Wong, et al., The effect of substitution of MgO for NaOH in peroxide bleaching of mechanical pulp on the content of the effluent, 59th Appita Annual Conference and Exhibition, Auckland, New Zealand, May 2005, Proceedings, pp. 291-297.

D.F.Wong, et al., Magnesium-based alkalis for hydrogen peroxide bleaching of mechanical pulps, Pulp & Paper Canada, Dec. 2006, pp. 68-73, 107:12.

Ray Harrison, et al., Refiner bleaching with magnesium hydroxide (Mg(OH)2) and hydrogen peroxide, TAPPI Journal, Sep. 2008, pp. 16-20.

International Search Report and Written Opinion of the International Searching Authority for PCT/US11/51209 mailed Jul. 12, 2012.

* cited by examiner

HIGH BRIGHTNESS PULPS FROM LIGNIN RICH WASTE PAPERS

CLAIM FOR PRIORITY

This non-provisional application is based upon U.S. Provisional Patent Application No. 61/403,466, of the same title, filed Sep. 16, 2010. The priority of U.S. Provisional Patent Application No. 61/403,466 is hereby claimed and the disclosure thereof is incorporated into this application by reference.

BACKGROUND OF THE INVENTION

Recycling of paper from a wide variety of sources is quickly becoming the norm. However re-use is often difficult and technology is often lacking for economical ways to re-use discards. As we re-use more and more, we continually need new ways to recycle lower and lower grades and incorporate the result in higher and higher grade products. In the case of paper, it is relatively easy to recycle the fiber in office waste but curbside papers are an entirely different matter.

Most office waste is primarily Kraft fiber contaminated with black xerographic ink so efficient techniques for recycling this grade are becoming increasingly common. Presently, almost 100 percent of the highest quality grades of paper, like printer's clippings and white office waste, is recycled. Those grades are considered premium secondary or recycled fiber sources as the original, high quality of the chemically produced virgin paper fibers makes it relatively inexpensive to recycle those fiber sources into a high brightness pulp. Accordingly, this class of waste-paper, and therefore the pulp therefrom, commands premium pricing.

However, curbside waste paper also comprises large amount of mechanical pulp contaminated with a variety of inks along with numerous other unmentionables. Recycling of papers, like those from curbside residential recycling, is more costly and difficult. Because those papers tend to include substantial groundwood content, the current technology used to recycle premium fibers is ill-suited for these lower grades of waste paper. Accordingly, recycling of mixed waste fiber streams presents a far more severe challenge as techniques which are suitable for bleaching of Kraft fiber may not be as well-suited for brightening of mechanical pulps. Particular problems with recycling mixed waste streams relate to fines, trash, scale, yield, and, of course, cost. Many of the techniques known for recycling of streams primarily comprised of Kraft fiber suffer from deficiencies which become aggravated when lower grade fibers are included, particularly when it is desired to use the resulting fiber for manufacturing absorbent papers. Accordingly, curbside waste paper tends to be far more modestly priced than office waste.

More specifically, the lower grade pulp fibers used in the original production of those curbside waste paper products suffer from a decreased brightness over the premium virgin or premium recycled fibers. Thus, the recycled fibers from those curbside waste paper products cannot easily be used to create premium or near-premium quality consumer products like bath tissue, facial tissue, paper towels, and napkins, since consumers tend to prefer higher brightness fibers in these products. Such products are considered premium or near premium due to, for example, their high brightness and/or low ink concentration. Even though current technologies make it possible to recycle some of those curbside waste papers, the high cost makes their use unattractive. In fact, in certain instances, the lower purchase cost of those curbside waste papers is often considerably or even completely offset by the higher cost of chemical treatments needed to produce acceptable brightness levels.

United States Patent Application Publication No. 2008/0087390 to Lee et al. relates to a method of bleaching recycled fibers comprising contacting the recycled fibers with at least an activating bleach step, an alkaline hydroxide step, and a reductive bleach step, wherein the activating bleach step comprises contacting the recycled fibers with at least one activating bleaching agent chosen from peracetic acid, peroxymonosulfuric acid, and an acylamide such as TAED.

U.S. Pat. No. 7,384,502 to Kamijo et al. relates to a process for preparing bleached mechanical pulp from wood chips by impregnating with a chemical liquor consisting essentially of an aqueous solution of an alkaline inorganic compound and a chelating agent at a pH range of 7-12. Specific examples of such impregnating agents include, e.g. aqueous solutions of alkaline inorganic compounds such as sodium hydroxide and potassium hydroxide, preferably aqueous sodium hydroxide solutions. Suggested chelating agents include diethylenetriaminepentaacetic acid, 2-hydroxyethylethylenediaminetriacetic acid, ethylenediaminetetraacetic acid, diethylenetriaminepenta(methylenephosphonic) acetic acid, or alkaline metal salts thereof. The liberated pulp is then bleached with oxidizing agents such as hydrogen peroxide, ozone and peracetic acid or with reducing agents such as sodium hydrosulfite (sodium dithionite), sodium hydrogen sulfate, sodium borohydride and formamidine sulfinic acid (FAS). Only the use of sodium hydroxide is exemplified in connection with their peroxide bleaching. It is claimed that mechanical pulps having high brightness can be prepared from even wood species previously considered to be unsuitable for mechanical pulps such as materials having low bleachability containing high levels of extractives. The process is said to expand the application of wood species that were difficult to convert into mechanical pulp, thus greatly contributing to environmental protection in terms of more effective use of wood. Moreover, the amount of bleaching agents used can be reduced.

U.S. Pat. No. 7,297,225 to Thomas et al. is one of the few references dealing directly with the issues involved in brightening of recycle fiber stating that:

> Typically the pulp for use in the present invention has previously undergone deinking and pulping . . . the bleaching process of the present invention may be incorporated at any point in the pulping process, according to one embodiment, the bleaching is carried out immediately after deinking of the pulp. Removal of contaminants that interfere with the bleaching process result in higher bleaching efficiencies. Compositions which may be introduced to the pulp for bleaching include hydrogen peroxide, and may include other bleaching agents including but not limited to, one or more of alkali hydroxide, gaseous oxygen, ozone, and peroxygen compounds (including, but not limited to, peracetic and peroxymonosulfuric acid). The bleaching agents may further include reductive agents (including, but not limited to, formadmidine [sic, formamidine]sulfinic acid (FAS), hydroxymethane sulfinic acid (HAS), sodium borohydride, and sodium hydrosulfite), and mixtures thereof. In one embodiment according to the present invention, hydrogen peroxide, sodium hydroxide, and gaseous oxygen are all added to the pulp for bleaching. Optionally, catalyzing or activating agents may be added.

Thomas points out that "bleaching with hydrogen peroxide has its drawbacks, because the bleaching effect is not as strong as with chlorine-based bleaches" and that:

Simply using greater amounts of hydrogen peroxide in the bleaching process does not solve the problem since merely increasing the amount of hydrogen peroxide results in large amounts of hydrogen peroxide remaining unreacted and therefore wasted.

Thomas discounts the concept of using multi-stage peroxide bleaching systems as "necessarily more costly and more complex to operate than single-stage bleaching systems" and instead bleaches at high temperature and pressure, while preventing flashing upon discharge by:

... use of a heat exchanger and a cooled recycle filtrate stream from the bleaching process ... [to] ... increase one or more of the efficiency, effectiveness, and safety of high temperature peroxide bleaching procedures.

While mentioning the use of alkali hydroxide in association with hydrogen peroxide, gaseous oxygen and peroxygen compounds, at an initial pH in the range of 10 to 11 or, in a preferred embodiment 10.4 to 10.6, the only specific alkali hydroxide mentioned by Thomas is sodium hydroxide.

U.S. Pat. No. 7,163,564 to Sibiet et al. relates to a method for brightening virgin mechanical pulp using a combination of (i) an aqueous solution comprising sodium borohydride and sodium hydroxide; and, (ii) an aqueous solution comprising sodium bisulfate.

U.S. Pat. No. 7,052,578 to Wajer et al. relates to bleaching of wood pulp:

using hydrogen peroxide as the oxidative bleaching agent in the presence of magnesium hydroxide or magnesium oxide. The bleaching process is carried out in the presence of magnesium hydroxide as the predominant, and preferably essential, source of alkali. The process optionally includes transition metal chelants, such as DTPA or EDTA in the bleaching slurry. The process eliminates the need for added caustic and silicate in such systems and can be carried out at or near neutral pH of 5.0 to 8.5.

Wajer et al. present numerous and extensive examples in which the amounts of $Mg(OH)_2$, $H_2O_2$, chelants, and locations for additions of various ingredients are investigated. Without equaling the brightness results obtained using sodium hydroxide and hydrogen peroxide and concluded that the technology:

... reduces chemicals costs by eliminating caustic soda and sodium silicate, and by reducing DTPA and hydrogen peroxide usage.

... eliminates scaling and abrasion caused by sodium silicate. Allows bleaching to occur in the refiners.

... provides comparable brightness to caustic soda and sodium silicate bleaching at a significantly lower pH.

... provides for peroxide bleaching at a lower pH, which potentially reduces pH adjustment costs downstream.

... improves bulk properties of bleached pulp compared to caustic soda.

... provides a divalent magnesium, which improves the dewatering properties of pulp thus reducing the need for chemicals and defoamers. The divalent magnesium ion can also aid in better settling for wastewater treatment operations.

... reduces organics (BOD/COD) in the bleaching effluent for lower wastewater treatment costs.

... provides for recycling of high peroxide residuals for a reduction in peroxide usage.

... provides for improved pulp strength properties compared to caustic soda.

and

... provides reduced anionic trash and cationic demand for improved papermaking operations.

U.S. Pat. No. 7,001,484 to Ni et al. relates to a process for peroxide bleaching of mechanical or high yield pulp, the process comprising adding to a pulp slurry at least one stabilizer for stabilizing low valency states of transition metal ions in the slurry; subsequently adding caustic soda to said slurry simultaneously with or subsequent to adding said at least one stabilizer; adding hydrogen peroxide to the slurry at a preselected point; and subjecting the slurry to preselected conditions to complete the bleaching process.

U.S. Pat. No. 6,866,749 to Delmas et al. relates to a method for bleaching different types of paper pulp in two steps at atmospheric pressure and at a temperature not higher than 100° C. The first step consists in contacting the unbleached paste [sic, pulp?] with a mixture of peracetic acid and performic acid. The second step consists in treating the bleached pulp derived from the first step, with a solution of soda and hydrogen peroxide. The resulting pulps are said to exhibit a high index of whiteness and a degree of polymerisation close to unbleached pulps.

U.S. Pat. No. 6,881,299 to Parrish et al. relates to methods of bleaching mechanical pulp under alkaline conditions with hydrogen peroxide. The methods include introducing a source of magnesium, hydroxyl and perhydroxyl ions to a refiner, typically in the form of magnesium oxide, water and hydrogen peroxide. Parrish teaches that:

Peroxide bleaching with sodium hydroxide/sodium silicate chemicals generates calcium oxalate scale ... [resulting in] ... tenacious deposits on the equipment ... [that] can end up in the finished paper product and cause problems with the paper press [while] Magnesium ions, on the other hand, react with oxalate ions to form magnesium oxalate that is more soluble than calcium oxalate, thus reducing scale . . . .

Magnesium oxide/hydroxide and hydrogen peroxide bleaching has the advantage of eliminating the use of sodium silicate. The high anionic charge associated with sodium silicate interferes with downstream paper machine retention aid chemistry. Silicates along with other process materials contribute to the conductivity and negative charge of the water. The elimination of sodium silicate should result in improved paper machine retentions, and allow for retention aid optimization . . . .

Using a magnesium oxide and water slurry as the substitute for sodium hydroxide and sodium silicate in a refiner lowers bleaching times ... reduces cost ... can be applied to any refiner bleaching process ... [and] can be used for high consistency mechanical pulps, as well as recycled pulps from post consumer sources, and chemical pulps, such as Kraft and sulfite pulps that are processed through a refiner . . . .

The brightness achieved by hydrogen peroxide bleaching using magnesium oxide/hydroxide/water is comparable to using sodium hydroxide/sodium silicate without the drawbacks of sodium hydroxide/sodium silicate and with no impact on bleaching efficiency.

U.S. Pat. No. 6,569,286 to Withenshaw et al., discusses the formation of a solution of peracetic acid by reacting solid (N,N,N',N'-tetraacetylethylenediamine, TAED) granules in water in the presence of hydrogen peroxide, a chelant, and caustic soda. The solution may be used to bleach a pulp in a single stage under alkaline conditions. Withenshaw et al., also discusses that the use of its pre-reacted TAED solution is superior to use of TAED either directly added to the pulp mixture or pre-reacted with any other type of peroxide solution. The single stage process is also supposedly superior to a process using an alkaline peroxide bleaching stage.

U.S. Pat. No. 6,743,332 to Haynes et al. relates to alkali peroxide bleaching of thermomechanical pulps at high temperatures, using an alkali buffer (such as soda ash or magnesium hydroxide), instead of sodium hydroxide. Buffering the system at lower pH (about 9 to about 10.5) is said to prevent peroxide decomposition and alkali darkening, but still provide adequate alkali to produce effective bleaching. The buffer is said to release alkalinity as necessary providing just enough alkalinity for slow, even production of perhydroxyl ions as needed for bleaching, prolonging the effective bleaching time, making the peroxide more effective and giving higher brightness and higher yields by reducing the breakdown of the wood fibers.

U.S. Pat. No. 6,632,328 to Wan et al. relates to a method for bleaching unbleached softwood or hardwood pulps using hydrogen peroxide without added alkali using an alkaline earth metal carbonate, preferably magnesium carbonate at elevated temperatures.

U.S. Pat. No. 6,524,437 to Vincent et al. relates to a process for peroxide bleaching of pulp using magnesium oxide or magnesium hydroxide as a substitute for caustic soda, the pulp being bleached in the presence of hydrogen peroxide characterized in that the concentrations of iron and manganese is controlled using DTPA, DTMPA, EDTA and/or HEDTA as chelants.

Several patents discuss using solid TAED as a component of a detergent composition, which are intended to be used to clean textiles and clothing. The issue addressed in these patents is achieving long term stability of the composition and activation of the bleach for final use. For example, U.S. Pat. No. 6,225,276 to Gassenmeier et al. coats the TAED compound with a polymeric acid, which then dissolves when the detergent composition is added to water to allow release of bleaching compounds. In addition, U.S. Pat. No. 4,283,302 to Foret et al., U.S. Pat. No. 4,338,210 to Clements et al., U.S. Pat. No. 4,938,889 to Wilsberg et al., U.S. Pat. No. 6,080,710 to Withenshaw et al., and U.S. Pat. No. 5,478,357 to Madison et al., all discuss the need to produce dry, shelf-stable detergent compositions that generate active bleaching compounds when wetted.

U.S. Pat. No. 6,221,209 to Desprez et al. relates to a process for bleaching chemical paper pulp to a brightness of at least 89° ISO, in a treatment sequence of several stages including a final bleaching stage with hydrogen peroxide in alkaline medium carried out in the presence of at least one stabilising agent and at a consistency of at least 25% by weight of solids.

U.S. Pat. No. 5,733,412 to Markham et al. discusses a method to decolorize unbleached Kraft "brown" fibers that may be a contaminant in mixed wastepapers. Markham's method requires fine screening mixed wastepaper, followed by a two-step bleaching process. That two-step process must alternate oxidative and reductive bleaching, where if the first step is oxidative then the second step must be reductive, and alternately if the first step is reductive then the second step must be oxidative. The first bleach step is carried out in a dispersion machine and at least one step must be carried out at high temperature (above 100° C.) and high pressure (exceeding one atmosphere). While Markham et al. disclose several oxidative and reductive agents, in its bleaching steps only a first FAS (thioureas dioxide) step followed by a second hydrogen peroxide step is preferred and practiced in the examples.

U.S. Pat. No. 5,645,686 to Troughton et al. discusses a three- to six-step bleaching process for chemical pulps, in which at least one of the steps involves contacting the pulp with an enzyme. Troughton et al. do not discuss the use of a reducing agent.

U.S. Pat. No. 5,589,032 to Chang et al. discusses a process to increase the generation efficiency of peracids from hydrogen peroxide. That method adds peroxymonosulfuric acid (Caro's acid) to a reaction vessel containing concentrated hydrogen peroxide and acetic acid. The addition of Caro's acid supposedly increases the generation of peracids. U.S. Pat. No. 5,693,185 also to Chang et al. discusses the use of a mixed peracid solution to brighten lignocellulosic and cellulosic pulps, for example, delignified wood pulps and cotton or cotton by-products.

U.S. Pat. No. 5,387,317 to Parthasarathy et al. discusses a method to delignify chemical pulp "brown stock" using a high temperature, high pressure process combining peracetic acid, ozone, and oxygen under acetic conditions.

U.S. Pat. No. 5,296,100 to Devic relates to a process for bleaching high-yield lignocellulosic wood pulps by (i) first pretreating such pulp with a complexing agent for metal ions and next washing the pretreated pulp, and then (ii) bleaching such pretreated/washed pulp with an initial amount of hydrogen peroxide in an alkaline medium, including adding a supplementary bleaching amount of hydrogen peroxide and a supplementary amount of an alkaline agent to the pulp over the course of the bleaching step (ii) without interrupting same, at a point in time when from 60% to 85% of the initial amount of hydrogen peroxide has been consumed, and such supplementary amount of hydrogen peroxide being equal to or less than the initial amount thereof.

U.S. Pat. No. 5,264,001 to Arifoglu et al. relates to a process for sequential oxidative and reductive bleaching of fibers in a single bath, which provide superior bleaching with less physical damage. Said processes comprising the steps of: (1) bleaching fibers with hydrogen peroxide; (2) adding either, (a) a material which combines with hydrogen peroxide to form a reductive bleaching agent, or (b) an inactivating material to inactivate unspent hydrogen peroxide with subsequent addition of a reductive bleaching agent; (3) reductively bleaching the already oxidatively bleached fibers; and, (4) adding an oxidizing material in an amount at least sufficient to oxide excess reductive bleaching agent.

U.S. Pat. No. 5,223,091 to Hetzler et al. relates to a process for brightening mechanical pulps by chelating to control the manganese content of the pulp to less than 30 parts per million and copper content less than 1 part per million by adding ions preferably magnesium ions as magnesium sulphate $MgSO_4$ in the amount of 400 to 3,000 ppm Mg ions retained by the pulp based on the oven dry weight of the pulp and thereafter applying a bleaching liquor composed of peroxide as hydrogen peroxide and an alkali as sodium hydroxide and containing no added sodium silicate.

U.S. Pat. No. 4,756,798 to Lachenal et al. relates to a process of bleaching mechanical pulp with hydrogen peroxide wherein the mechanical pulp is subjected to oxygen pressure prior to or simultaneously with said peroxide treatment.

U.S. Pat. No. 4,548,674 to Hageman discusses the problem of removing polymeric tape contaminants from wastepaper during a recycling process. Peracetic acid is applied to contaminated wastepaper at an acid pH (between 2.5 to 6.5) and aids in the breakdown of the adhesive polymers. No brightness gain is achieved through the peracetic acid treatment at the disclosed operating conditions.

U.S. Pat. No. 4,400,237 to Kruger et al. discusses a process for bleaching cellulose using a two-step process, wherein organic peracids are applied to the pulp at an acid pH followed by a hydrogen peroxide step at alkaline pH.

A three-stage oxidative bleaching stage for bleaching chemical lignocellulosic pulps is discussed in U.S. Pat. No. 4,372,812 to Phillips et al. That process uses an oxygen bleaching stage followed by a peroxide bleaching stage followed by at least one ozone bleaching stage. The peroxide bleaching stage may use alkaline hydrogen peroxide, acid hydrogen peroxide, or a peracid bleaching agent. The patent discusses that each bleaching stage should be followed by a washing stage to remove residual chemicals and bleaching byproducts, and also discusses the wash filtrates may be utilized in a countercurrent flow where the filtrate from the following stage is utilized as the wash water in the preceding stage.

U.S. Pat. No. 4,187,141 to Ahrel relates to a process of producing mechanical pulp in a defibration apparatus in which wood chips are ground between a pair of discs in a pressurized grinding zone. Prior to defibrating, the chips are impregnated with a solution of alkali, selected from the group consisting of sodium hydroxide, alkali silicate, alkali carbonate and alkali bicarbonate, and peroxide, surplus impregnating solution is removed from the chips by compression of the chips, the chips are introduced into a pressure vessel in communication with the grinding zone and compressed air is introduced into the pressure vessel in an amount sufficient to maintain the chips in the pressure vessel at a temperature below 90° C. and to maintain superatmospheric pressure within the defibrating zone.

The use of peracetic acid has been suggested as a component of elemental chlorine-free bleaching and/or delignification sequences for chemical pulps. U.S. Pat. No. 3,720,577 to Roymoulik discusses a two-stage process that may involve a chlorine dioxide bleaching step followed by washing and a peracetic acid bleaching step. A three-stage process is also discussed using chlorine dioxide followed by peracetic acid followed by an additional chlorine dioxide bleaching step. Pulp washing is practiced after each bleaching step. In U.S. Pat. No. 3,695,995, Roymoulik further discusses a two- or three-stage elemental chlorine free process for bleaching chemical pulps that utilizes an oxygen stage as the first bleaching step, which must have a "protector" compound added to prevent degradation of the cellulose fibers. The protector is a polysulfide having the formula $Na_2S_x$, where x is an integer from 1 to 4, and/or $Na_2S_2O_4$.

U.S. Pat. No. 3,867,246 to Hebbel et al. relates to bleaching of cellulose in an aqueous medium in several steps using an inorganic or organic peroxide or hydroperoxide under alkaline conditions, an organic percarboxylic acid or water soluble salt thereof and an inorganic or organic peroxide or hydroperoxide under alkaline conditions.

European Patent No. 0148712 to Dubreux relates to a process for bleaching chemical pulps using hydrogen peroxide, in a single stage at a pH of 11 to 11.5, at a temperature of 70° C. to 100° C. in a solution containing hydrogen peroxide, at least one alkaline agent chosen from sodium hydroxide and sodium carbonate, at least one alkali metal silicate, at least one magnesium salt and at least one calcium salt these elements being maintained in the dissolved state with a complexing agent for alkaline-earth ions.

International Patent Application Publication No. WO 96/41917 (also U.S. Pat. No. 6,056,853 to Vincent et al.) relates to a process for peroxide bleaching of pulp using magnesium oxide as the sole alkaline source wherein said pulp is bleached in the presence of hydrogen peroxide for a maximum period of 180 minutes and achievement of a target ISO brightness of 65 in regard to freshly prepared pulp characterised in that magnesium oxide is utilised as MgO particles having a particle size of 5-500 microns and a particle surface area (PSA) of between 20-60 $m^2/g$.

SUMMARY OF THE INVENTION

This application relates to methods for preparing premium or near-premium brightness pulps for towel and tissue applications from fiber sources comprising substantial amounts of high-yield (i.e., lignin-containing) pulp as well as chemical pulp while controlling fines, scale and anionic trash. In general, these methods use alkaline hydroxide in combination with peroxide and oxygen for initial bleaching stages followed by treatment with a peroxide activating agent to convert residual peroxide in the pulp into peracetic acid followed by a final reductive bleaching stage. More specifically, these methods control the alkalinity of the pulping process either by using hydroxides based exclusively or primarily on magnesium or by using hydroxides based exclusively or primarily on magnesium in conjunction with carefully controlled application of sodium hydroxide. In the practice of these processes, hydrogen peroxide may be applied more liberally than in more conventional processes as the residual hydrogen peroxide remaining in the pulp after the alkaline peroxide/oxygen stage is converted in situ into peracetic acid without being requiring an expensive and/or difficult separation of the peroxide containing residual liquor from the pulp. The final stage of the bleaching process is reductive bleaching stage based preferably on hydrosulfite or sodium borohydride.

In one embodiment, the present invention relates to a multistage process for bleaching of a recycled pulp, comprising the steps of: contacting a cellulosic admixture of recycle containing fiber at high consistency and atmospheric pressure with a magnesium hydroxide generating species chosen from the group consisting of MgO and $Mg(OH)_2$ in an amount of from 0 up to 2% based on the OD (oven dry) weight of the pulp, $H_2O_2$ in an amount of from 0 up to 5% based on the OD weight of the pulp; and heating and mixing the admixture of pulp, magnesium hydroxide generating species and hydrogen peroxide with steam to a temperature of at least about 60° C. (140° F.), contacting the heated cellulosic admixture of pulp, magnesium hydroxide generating species and hydrogen peroxide with a further amount of magnesium hydroxide generating species chosen from the group consisting of MgO and $Mg(OH)_2$ in an amount of from 0 up to 2% based on the OD weight of the pulp, and hydrogen peroxide in an amount of from 0 up to 5% based on the OD weight of the pulp, and oxygen in an amount of from 0 up to about 1%, the total amount of magnesium hydroxide and hydrogen peroxide added in both steps being from at least about 0.1 to about 2% and from about 0.1 to about 5% respectively; retaining the cellulosic admixture in contact with said $Mg(OH)_2$ and said $H_2O_2$ for a period sufficient to increase the GE (TAPPI T452) brightness thereof by at least about 5 points while retaining $H_2O_2$ in said cellulosic admixture at levels of at least about 50% of the amount previously introduced; thereafter contacting the brightened mixture with a peroxide activating agent chosen from the group consisting of tetraacetylethylenediamine, acetic anhydride and acetyl chloride and thereby generating a peracid acid in situ from residual peroxide in the brightened mixture; and thereafter treating the brightened pulp with a reductive bleaching composition. Typically for each 0.45 kg (1 pound) of magnesium hydroxide used, the process uses from about 0.45 kg (1 pound) to about 0.80 kg (1.75 pounds) of hydrogen peroxide; 0 to about 0.68 kg (1.5 pounds) of sodium hydroxide, about 3.0 kg (6.5 pounds) to about 3.9 kg (8.5 pounds) of TAED or about 0.68 kg (1.5 pounds) to about 0.9 kg (2 pounds) of acetic anhydride. In most cases, it will be preferable to perhaps be more liberal with hydrogen peroxide than with TAED or acetic anhydride as the expensive TAED or acetic anhydride is largely wasted if it is unable to react with hydrogen peroxide to form peracetic acid.

In another aspect, the present invention relates to a multistage process for bleaching of a recycle pulp containing at least about 90% Kraft fiber and at least about 10% high yield fiber, comprising the steps of: contacting a cellulosic admixture of recycle containing fiber, said fiber containing at least about 90% Kraft fiber and at least about 10% mechanical pulp with a magnesium hydroxide generating species chosen from the group consisting of MgO and $Mg(OH)_2$ in an amount of from 0.1% to 2% based on the OD weight of the pulp; contacting the admixture of pulp and $Mg(OH)_2$ with $H_2O_2$ in an amount of from 0.15 to 5% based on the OD weight of the pulp and, optionally $O_2$, while retaining a residual level of $H_2O_2$ in the admixture of at least about 0.1% of the OD weight of the pulp; thereafter contacting the $H_2O_2$ containing mixture with a peroxide activating agent chosen from the group consisting of tetraacetylethylenediamine, acetic anhydride and acetyl chloride and thereby generating peracetic acid in situ; and thereafter treating the brightened pulp with a reductive bleaching composition.

Another embodiment of the present invention relates to a multi-stage process for bleaching of a recycle pulp containing at least about 50% Kraft fiber, comprising the steps of: providing a fiberized admixture of recycle containing fiber, said fiber containing at least about 50% Kraft fiber and at least about 10% mechanical pulp, said pulp having an initial brightness of less than 70 as measured by ISO 2469/2470; contacting the fiber at low pressure and high consistency with a magnesium hydroxide generating species chosen from the group consisting of MgO and $Mg(OH)_2$ in an amount of from about 0.1 to about 2% based on the OD weight of the pulp; thereafter mixing and heating the admixture of pulp and $Mg(OH)_2$ by contacting it with steam; contacting the admixture of pulp and $Mg(OH)_2$ with $H_2O_2$ in an amount of from 0.1 to 2.0% based on the OD weight of the pulp and, optionally $O_2$, in the substantial absence of sodium containing bleaching chemicals; allowing the peroxide containing admixture to increase in brightness by at least about 5 points as measured by ISO 2469/2470; while retaining a residual level of $H_2O_2$ in the admixture of at least about 0.1%; contacting the $H_2O_2$ containing mixture with a peroxide activating agent chosen from the group consisting of tetraacetylethylenediamine, acetic anhydride, and acetyl chloride and thereby generating peracetic acid in situ; thereafter treating the brightened pulp with a reductive bleaching composition chosen from the group consisting of sodium borohydride, sodium hydrosulphite, sodium formaldehyde sulfoxylate ("SFS") and formamidine sulphinic acid ("FAS"); and recovering a pulp having a brightness of at least 75 as measured by ISO 2469/2470.

There are several beneficial impacts from $Mg(OH)_2$ use in peroxide bleaching. The first impact is a reduction in fiber damage from the "protection" properties of the chemical. Research has shown that magnesium compounds inhibit damage to fibers when present in alkaline oxidative conditions. The second impact is on bleaching speed. $Mg(OH)_2$ has only limited solubility in water solution and dissolves slowly. In an alkaline peroxide bleach, the hydrogen peroxide reacts with alkali to form the perhydroxyl anion (OOH-) which is the active bleaching agent. The slow release of alkali from $Mg(OH)_2$ causes a slow steady formation of perhydroxyl anion which allows bleaching without excessive generation of fiber damaging radicals. This allows brightening of the pulp with reduced chemical consumption and less generation of anionic trash, fines and damaged fibers. In addition, magnesium hydroxide boosts the effectiveness of peroxide in the sense that each pound of peroxide consumed seems to produce a greater increase in brightness. For example, if consumption of 45 kg (100 pounds) of peroxide might lead to an increase about 3 to about 5 points of brightness when used with another bleaching chemistry, when peroxide and magnesium hydroxide are used in combination, either the same increase in brightness might be achievable with far fewer pounds of peroxide or significantly increased brightness might be achieved with the same amount of peroxide perhaps as much as from about 6 to about 9 points more than would be achievable with more conventional bleaching chemistries. This benefit is particularly important as, at least at current prices, the cost of the hydrogen peroxide consumed is a very large contributor to the overall cost of bleaching. In particular, this advantage makes it possible for the papermaker to use lower grades of wastepaper which are less costly and more widely available but still achieve acceptable brightness at either an improved cost position or to use the more widely available lower grade recycled fiber comprising both Kraft and lignin containing fibers to achieve comparable results while still retaining a competitive cost position.

Alkaline Peroxide Step

The alkaline peroxide step comprises contacting the recycled fibers with at least one alkaline peroxide agent. In one embodiment, the at least one alkaline peroxide agent is a mixture of hydrogen peroxide and at least one alkaline hydroxide agent based on magnesium hydroxide. In yet another embodiment, the at least one alkaline peroxide agent is chosen to generate perhydroxyl anions (—OOH) from hydrogen peroxide at a pH from about 8 to about 9.5. The at least one alkaline hydroxide agent may be one of a mixture of known caustic compounds, including, but not limited to magnesium hydroxide, calcium hydroxide and finely divided magnesium oxide. In one embodiment, the at least one alkaline hydroxide agent is magnesium hydroxide. In another embodiment, the at least one alkaline hydroxide agent is finely divided magnesium oxide which generates magnesium hydroxide in water. In a further embodiment, the at least one alkaline hydroxide agent is a mixture of magnesium hydroxide in a first alkaline peroxide bleaching step followed by a carefully controlled sodium hydroxide bleaching step. In still a further embodiment, the at least one alkaline hydroxide agent is a mixture of hydrogen peroxide and sodium hydroxide.

The alkaline hydroxide agent may be added in any amount to effect the desired increase in brightness of the fibers. In one embodiment, the peroxide is added in the amount of 0.5% on fiber dose. In another embodiment, the peroxide is added in the amount of less than about 4% on fiber dose. In a further embodiment, the peroxide is added in the amount of less than about 2% on fiber dose. In all cases where sodium hydroxide is used, the amount of sodium hydroxide and the temperature of both the added hydroxide and the admixture to which it is applied are carefully controlled to limit damaging and darkening of the fibers, especially the lignin containing high yield fiber such as groundwood, mechanical pulp, thermomechanical pulp (TMP), chemithermomechanical pulp (CTMP), bleached chemithermomechanical pulp (BCTMP) and the like. Throughout this specification and claims, where the amount of a bleaching chemical is expressed in percent (%), that percentage should be understood to be a percentage of the oven dry weight of the pulp being bleached unless otherwise indicated. Similarly, where brightness is indicated, that should be understood to be as measured by ISO 2469/2470 unless otherwise indicated.

Prior to addition of peroxide to the pulp, it is usually considered desirable and beneficial to treat the pulp with a chelating agent to sequester iron and manganese which are thought to undesirably react with (decompose) the peroxide, greatly decreasing its effectiveness. Suitable chelating agents comprise:

DTPA, (also known as diethylenetriaminepentaacetic acid; diethylenetriamine-N,N,N',N',N''-pentaacetic acid; pentetic acid; N,N-Bis(2-(bis-(carboxymethyl)amino) ethyl)-glycine; diethylenetriamine pentaacetic acid, [[(Carboxymethyl)imino]bis(ethylenenitrilo)]-tetra-acetic acid);

EDTA: (also known as edetic acid; ethylenedinitrilotet-raacetic acid; EDTA free base; EDTA free acid; ethyl-enediamine-N,N,N',N'-tetraacetic acid; hampene; Versene; N,N'-1,2-ethane diylbis-(N-(carboxymethyl) glycine); ethylenediamine tetra-acetic acid);

NTA, (also known as N,N-bis(carboxymethyl)glycine; triglycollamic acid; trilone A; alpha,alpha',alpha''-trim-ethylaminetricarboxylic acid; tri(carboxymethyl) amine; aminotriacetic acid; Hampshire NTA acid; nitrilo-2,2',2''-triacetic acid; titriplex i; nitrilotriacetic acid);

APCA (aminopolycarboxylic acids);

phosphonic acids;

EDTMP (ethylenediaminetetramethylene-phosphonic acid);

DTPMP (diethylene triaminepentamethylenephosphonic acid);

NTMP (nitrilotrimethylenephosphonic acid);

polycarboxylic acids, gluconates, citrates, polyacrylates, and polyaspartates or any combination thereof.

Other known chelating agents for iron and manganese may be used as well.

In general, use of an increased temperature for the alkaline peroxide step may result in an increased brightness gain. Such an increased temperature may require a pressurized reaction vessel and would generally require increased energy consumption. Such an increased temperature may also result in heat management issues within the pulp system. In one embodiment, the temperature of the alkaline peroxide step is less than about 121° C. (250° F.).

Peroxide Activating Step

The activating step comprises contacting the fibers bearing significant residual peroxide with at least one agent known to produce perhydroxyl groups or peracetic acid, called hereinafter a peroxide activating agent. Perhydroxyl groups produce active oxygen which is very effective in bleaching. In one embodiment, the peroxide activating agent is capable of producing from about one to about nine pounds of active oxygen per ton of pulp. A bleach activator may be any one or mixtures of more than one acetyl donor. Preferably, the activator is one or mixtures of more than one of the compounds of the formula I:

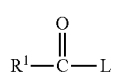

in which L is a leaving group attached via an oxygen or a nitrogen atom to the C=O carbon atom and $R^1$ is acetyl.

The leaving group L is preferably a group, the conjugate acid of which has a pKa in the range 4 to 13, preferably 7 to 11, most preferably 8 to 11.

Substituents on L can include hydroxyl, =N—$R^2$ in which $R^2$ is preferably chosen from lower alkyl amine, acyl, acyloxy, alkoxy, aryl, aroyl, aryloxy, aroyloxy, halogen, amido, and imido groups and the like as well as other groups not adversely affecting the activity of the activator.

In one embodiment, the peroxide activating agent is an acylamide. In one such embodiment, the at least one acylamide is TAED. TAED refers to N,N,N',N'-tetraacetylethyl-enediamine, an acylamide that may be available commercially under the Clairant trade name PERACTIVE®-P or under the Warwick International trade name PEROXY-BOOST®. Other activators which are available for use in the invention are pentaacetyl glucose (PAG), and tetraacetylgly-coluril (TAGU). In one embodiment, a mixture of TAED and peroxide compound produces peracetic acid. In another embodiment, either TAED or hydrogen peroxide is added directly to the pulp followed by addition of the other.

A particular advantage of using TAED as the peroxide activating agent is that the subsequent bleaching due to generation of peracetic acid and thereby perhydroxyl groups the residual bleach step may be carried out at a lower temperature than if hydrogen peroxide is used alone. Lower temperatures for the residual bleach step may have the benefit of lower energy costs, increasing the economic and commercial benefits of the inventive process. In one embodiment, the residual bleach step is conducted at or about room temperature, e.g., 21° C. (70° F.). In another embodiment, the residual bleach step is conducted at a temperature above room temperature to increase the effectiveness (i.e., enhance the bleaching and/or decolorizing effect) of the peracetic acid.

In another embodiment, the peroxide activating agent is TAED directly added to the unbleached pulp prior to an alkaline peroxide bleaching step. In this embodiment, the recycled fibers should be conducted or added, without washing, to the step in which the peroxide activating agent dispersed through the pulp admixture comes into contact with peroxide, as in an alkaline peroxide step. For example, in another embodiment, bleached fibers from an alkaline peroxide step may be conducted, without washing, to a residual bleaching step, in which the peroxide is converted in situ to peracetic acid by addition of peroxide activating agent.

In a further embodiment, finely divided granules of TAED are suspended or dispersed in water in an amount of about 1% by weight prior to addition to the pulp admixture. In another embodiment, the amount of the peroxide activating agent is from 0.05 to 0.4 percent by weight of recycled fibers. In still another embodiment, the amount of the peroxide activating agent is less than 0.25 percent by weight of recycled fibers. In a further embodiment, the amount of the peroxide activating agent is any amount capable of providing a desired increase in brightness. In yet another embodiment, the amount of the peroxide activating agent is set to achieve the desired level of brightness increase with a minimum amount of residual agents passing that must be removed or neutralized before the reductive bleaching step. In all embodiments, excess amounts of the peroxide activating agent should not negatively impact the effectiveness of the disclosed process.

The time, temperature, and concentration of the alkaline peroxide step and the residual bleach step can be controlled to effect a desired change in the Kappa number and ISO brightness of the recycled fibers. The residence time of both the alkaline peroxide step and the residual bleach step is a function of the temperature and chemical concentration of those steps. In general, increases in the temperature and/or the chemical concentration increase the reaction rate of a given step and decrease the reaction time. In one embodiment, the reaction time in the residual bleaching step is chosen to achieve about 90% consumption of the peroxide activating agent. In another embodiment, the reaction time is chosen to achieve less than about 95% consumption of the peroxide activating bleaching agent, as greater than about 95% consumption may result in brightness reversion due to alkaline darkening of the lignin. In an embodiment of the present invention in which the residual bleach step follows the alkaline peroxide step, the reaction time in the alkaline peroxide step is chosen to achieve about 50% consumption of the at least one alkaline peroxide agent, such that the unreacted portion of the at least one alkaline peroxide agent may react with the at least one peroxide activating agent (or at least one of the components of the at least one activating bleaching agent) to generate additional active oxygen. As noted, when the bleaching mix comprises sodium hydroxide in addition to magnesium hydroxide, time, temperature and concentration must be carefully controlled.

Washing

The pulp subjected to treatment according to the present invention may be washed between one or more steps. Such a wash may be used to remove residual chemicals or agents that would interfere with a subsequent step or steps. Such a wash may also be used to remove any undesirable byproducts of a step or steps, such as organics, free lignin, and lignin byproducts. Removal of those undesirable byproducts may help prevent any interference of those byproducts with chemicals used in the paper-making process. Removal of those undesirable byproducts may also help prevent the formation of biological slimes or other deposits in the paper-making machinery. In one embodiment of the invention, the pulp is washed before the reductive bleach step. However, it is generally not desirable to wash prior to a residual bleaching step or between successive alkaline peroxide bleaching steps. It is an advantage of the present invention that usually only two wash steps are required—prior and subsequent to the reductive bleaching step. Prior to reductive bleaching, the wash assists in the removal of residual oxidative chemicals that would interfere with the reductive bleach step (for instance, by consuming the at least one reductive bleach agent).

If the operator insists on washing after an alkaline peroxide bleach stage, wash filtrate from the alkaline peroxide step may be recovered and used in the residual bleach step and/or a subsequent alkaline peroxide step; but, in general, we prefer to forego washing other than before and after reductive bleaching.

In one embodiment, residual amounts of the at least one alkaline peroxide agent, or residual amounts of any compounds in combination with the at least one alkaline peroxide agent, may react with the at least one peroxide activating agent to generate active oxygen. In such an embodiment, residual amounts of the at least one alkaline peroxide agent may generate additional active oxygen when contacting and reacting with the TAED. Moreover, in such an embodiment where alkaline peroxide agent is present in the activating bleach step, lower reaction temperatures may be used in the alkaline peroxide step to achieve similar brightness gains. However, when the pulp is washed before the reductive bleach step, any residual chemicals from the alkaline peroxide step and the residual bleach step may be reused.

Reductive Bleach Step

The reductive bleach step comprises contacting the recycled pulp with at least one reductive bleaching agent. In one embodiment, the reductive bleach step removes or decreases the color hue, intensity, or brightness of any dye that may be present in the pulp. The at least one reductive bleaching agent may be any of or a mixture of agents known to those of ordinary skill in the art, including one or more of zinc hydro sulfite, sodium hydro sulfite (SHS, $Na_2S_2O_4$, also known as hydrolin, sodium dithionite, sodium sulfoxylate, and sodium hydrosulphite), formamidine sulfinic acid (FAS, also known as thiourea dioxide), hydroxyl methyl sulfinic acid (HAS), sodium hydrosulfite, or borohydrides including, but not limited to, sodium borohydride ($NaBH_4$, aka sodium tetrahydridoborate). Sodium bisulfite (SBS) is often used with sodium borohydride to generate reductive bleaching agent. In one embodiment, the reductive bleaching agent is sodium hydrosulfite.

The reductive bleach agent may be added in any amount necessary to effect the desired increase in brightness of the fibers. In one embodiment, the reductive bleach agent is added in an amount of less than about 2% on pulp dose. In another embodiment, the reductive bleach agent is added in an amount of 0.1% to 0.8% on pulp dose.

The reaction conditions of the reductive bleach step may be modified to effect greater increases in brightness. In a further embodiment, brightness gains in the pulp from the activating bleach step and the alkaline peroxide step allow at least one of (1) the use of less at least one reductive bleach agent, (2) less reaction time of the pulp with the at least one reductive bleach agent, and (3) a lower temperature for the reductive bleach step.

In one embodiment, the temperature of the reductive bleach step is about the same or greater than the temperature of the alkaline peroxide step and/or the activating bleach step. Such high temperatures may result in faster and more complete bleaching of the pulp in the reductive bleach step, but may also require higher amounts of energy and higher capital costs. In another embodiment, the temperature of the reductive bleach step is less than the temperature of the alkaline peroxide step and/or the activating bleach step. In some cases, the size of the vessel used for reductive bleaching will be comparable to those used for the oxidative stages; but in many cases, the rate of reaction of the reductive bleaching species will be sufficiently rapid that the reaction be accomplished in a line leading from the stage at which the reductive bleaching agent is mixed with the pulp to the next stage in the process, perhaps a washer or pH adjustment stage just prior the paper machine.

Many paper-making machines run at an overall pH generally in the range of about 7 to about 8. A pH of less than about 7 may result in greater amounts of stress on the papermaking equipment, for instance, in increased corrosion. A pH of less than about 7 may also affect the pulp in that the lower pH may result in a lower brightness level, particularly for wastepaper-derived pulps. Such an acidic pH may result in a lower brightness level due to the yellowing of residual lignin or yellowing of non-fiber elements, such as clays or carbonates. Conversely, a pH of greater than about 8 may affect the pulp in that the higher pH may result in a lower brightness level, particularly for pulps with a high lignin content. Such an alkaline pH may result in a lower brightness level due to alkali darkening of the pulp.

By proper sequencing of bleaching stages, it is possible to minimize the need to adjust pH between stages. In particular, if one or two alkaline peroxide stages using $Mg(OH)_2$ are followed by a residual bleaching stage followed by a reductive bleaching stage, only minimal interstage pH adjustment may be required as the initial alkaline peroxide bleaching can be carried out at an entry pH of about 8.5 to 9.5 which, by virtue of the low solubility and reaction rate of the magnesium hydroxide, decreases only slightly as the pulp admixture passes through the residual bleach tower and, then by virtue of washing, is brought to between about to from about 7.5 to about 8.5 prior to reductive bleaching from which it emerges at a pH of between about 7 and 8, therefore requiring little pH adjustment to bring it to the optimum, usually neutral to very slightly alkaline, pH before it is passed to the paper machine. It is usually considered desirable to ensure that pH in the paper machine is not below 7 but is not too much into the alkaline range as high pH, in some cases, can contribute to foaming, low chemical efficiency and degradation of the Yankee coating.

Further details and aspects of the present invention are described in more detail below.

DETAILED DESCRIPTION

The invention is described in detail below for purposes of illustration only. Modifications within the spirit and scope of the invention, set forth in the appended claims, will be readily apparent to one of skill in the art. As used herein, terminology and abbreviations have their ordinary meaning unless otherwise stated.

Figure 1:
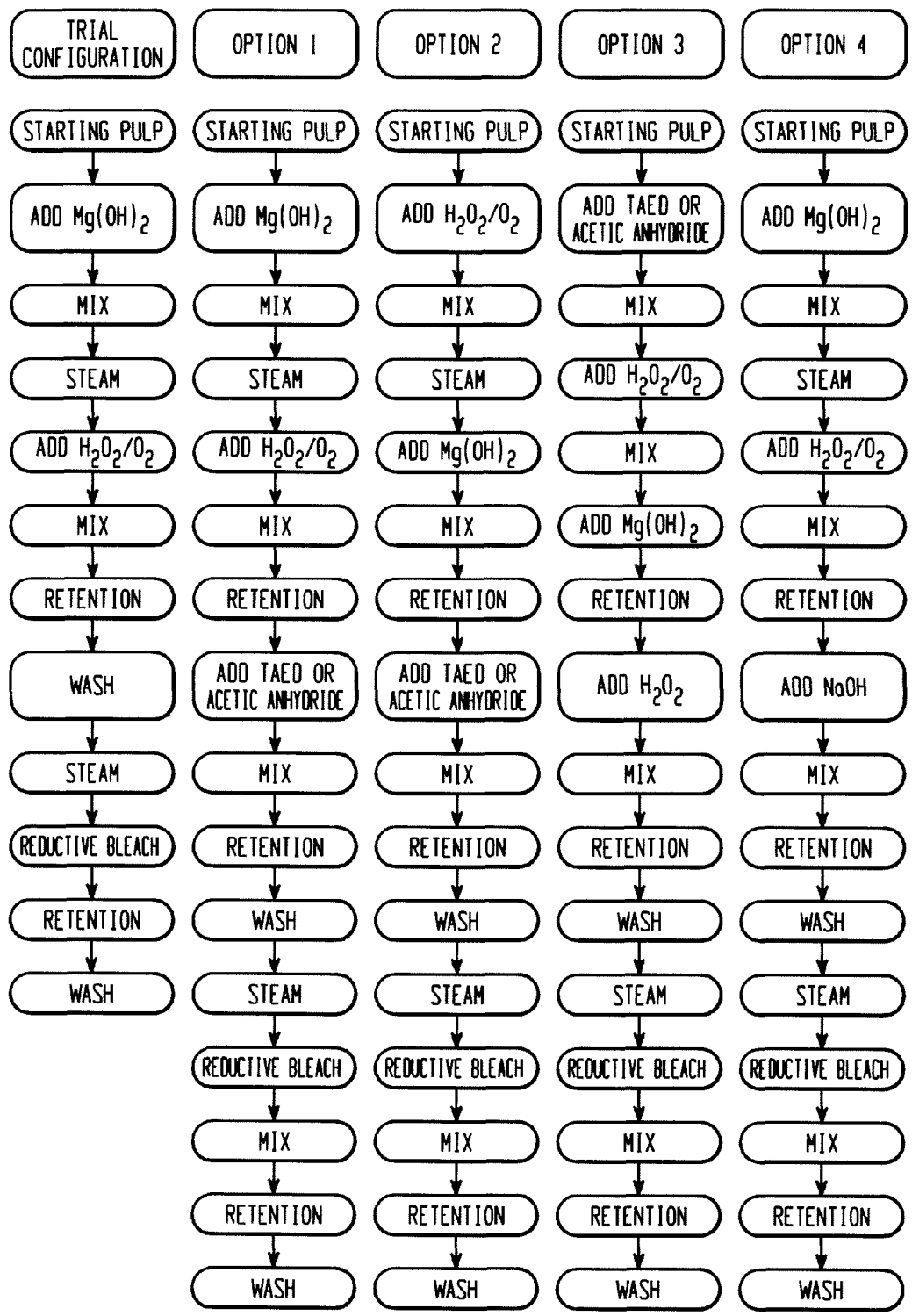
FIG. 1 is a diagram illustrating various options for bleaching.

FIG. 1 illustrates the sequence of steps employed in a variety of bleach processes wherein starting pulp containing a mixture of chemical and high yield fibers pass through a sequence of steps. Where a particular block in the flow diagram states "Add $Mg(OH)_2$" or "Add $H_2O_2$" or "Add TAED or Acetic Anhydride", it should be understood that the indicated additive, or a precursor therefor, is incorporated into the pulp admixture in an amount which is effective when combined with the other additives indicated in the other blocks of that sequence to produce a brightening on lightening of the pulp as indicated in the body of the specification. Similarly, "MIX" indicates that the pulp admixture is thoroughly homogenized on such a scale that the individual fibers in the admixture are not unduly damaged but grosser inhomogeneities in the distribution of bleaching ingredients are reduced to such an extent that the resulting paper made from such pulp will be commercially acceptable. Typically this is done by passing the admixture through a medium consistency/high shear pump although impellers in a tank can have some effectiveness. "STEAM" indicates that the pulp admixture is heated by injection of live steam to a temperature which will be effective for the intended process steps following in the sequence, typically a "RETENTION" step in which the admixture is allowed to internally equilibrate to allow color bodies to be lightened. "WASH" steps indicate that the pulp admixture is contacted with relatively "clean" aqueous liquid to remove unreacted reactants as well as undesired reaction products from the pulp. In this sense, "clean" does not usually mean clear potable water but rather some other stream containing the unreacted reactants and undesired reaction products in a lower, hopefully far lower, concentration than the pulp admixture.

Figure 2:
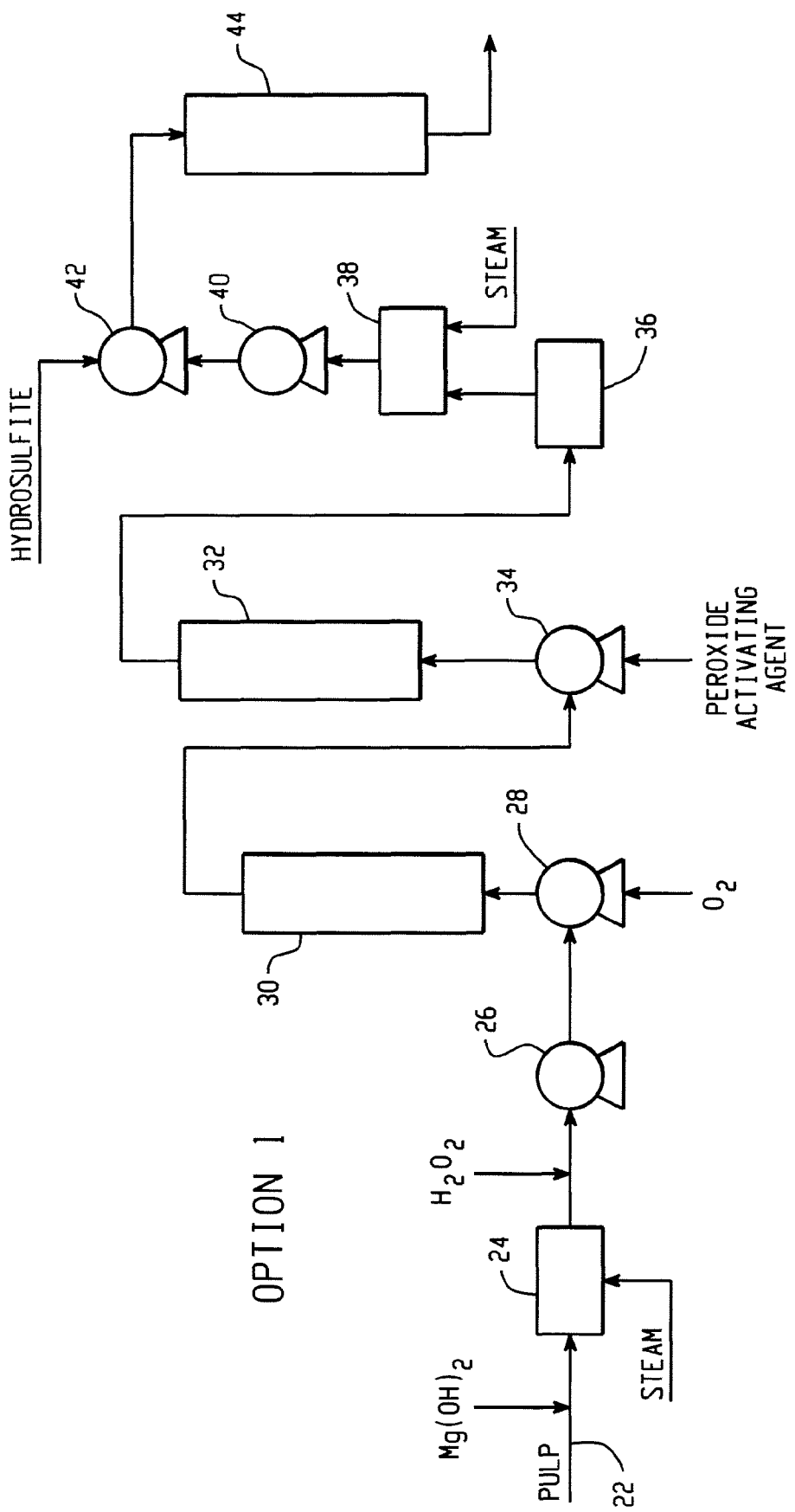
FIGS. 2-5 illustrate flow diagrams for options 1-4 from FIG. 1, respectively.

FIG. 2 illustrates the flow diagram for the process summarized as Option 1, in which medium consistency pulp enters through feed line 22, mixing therein with magnesium hydroxide entering feed line 22 prior to steam mixer 24 wherein the pulp and magnesium hydroxide admixture are heated to a temperature of between about 60° C. (140° F.) and about 100° C. (212° F.), preferably between about 71° C. (160° F.) and just below boiling, more preferably between 82° C. (180° F.) and about 93° C. (200° F.) while the magnesium hydroxide is thoroughly mixed with the pulp in steam mixer 24 which may be either of the type in which steam is injected into a flowing stream of pulp and mixing occurs by virtue of the shear created as the pulp flows or of the tank type where steam is injected into a stirred tank. After the pulp is thoroughly mixed with magnesium hydroxide, hydrogen peroxide is added prior to the inlet to medium consistency mixing pump 26. Molecular oxygen ($O_2$) is added to the admixture of pulp, magnesium hydroxide and hydrogen peroxide at the suction inlet to medium consistency mixing pump 28 which impels the mixture to primary bleach tower 30. Preferably, commercially pure oxygen is used although any oxygen enriched stream or even atmospheric air is usable but the ultimate goal is most preferably to completely saturate the admixture with oxygen and this is far more easily accomplished with relatively pure gaseous oxygen. It is not necessary to achieve complete saturation to achieve substantial benefits from injection of a stream carrying oxygen.

Pulp flows upwardly through primary bleach tower 30 which is sized to provide a residence time of from about 30 to about 240 minutes, preferably from about 60 to about 210 minutes and more preferably from about 120 to about 180 minutes. Inlet temperature to primary bleach tower 30 is suitably from about 100° C. (212° F.) to about 77° C. (170° F.), preferably at least slightly below boiling and more preferably between about 82° C. (180° F.) and about 93° C. (200° F.) while the outlet temperature is suitably between about 60° C. (140° F.) and about 88° C. (190° F.), preferably between about 77° C. (170° F.) and about 82° C. (180° F.). In some cases, particularly in the case where there is substantial decomposition of hydrogen peroxide or some other significant exothermic bleaching reaction, it is possible that temperature may increase during an oxidative bleach stage. Typically, the amount of the increase would be minor, with an increase of 0.5 to about 3° C. (~1-5° F.) not being exceptional. It is considered beneficial that usually only a small amount of heat is evolved when fibers are bleached with the combination of peroxide and magnesium hydroxide as there is a reduced tendency to damage the fibers as compared to the case where sodium hydroxide is used and the amount of heat evolved can be far more substantial. The residence time in primary bleach tower 30 is typically somewhat longer than would be the case where sodium hydroxide might be used as the source of alkalinity; however the damage to fibers is greatly reduced resulting in greatly reduced generation of fines and anionic trash. Preferably, the pulp is not washed between primary bleach tower 30 and residual bleach tower 32 as it is far more effective to leave unreacted hydrogen peroxide in place to be converted to peracetic acid in situ in residual bleach tower 32. Typically, the inlet concentration of hydrogen peroxide to primary bleach tower 30 will be between about 0.1 and 5%, preferably between about 0.5 and 3.5%, more preferably between about 1 and about 2, while the concentration of magnesium hydroxide will be between about 0.1% and about 2%, preferably between about 0.2 and 1.5%, more preferably between about 0.4 and about 0.8%. Desirably, inlet concentration of oxygen to primary bleach tower 30 will be between about 0.1 and 1% of the weight of the pulp, preferably between about 0.15 and 0.75%, more preferably between about 0.25 and about 0.5%. Entry pH is from about 7 to 10, preferably from about 7.5 to about 9.7, more preferably from about 8.5 to about 9.5, while pH at the exit to primary bleach tower 30 is from about 7 to about 9, preferably from about 7.25 to about 8.75, more preferably from about 7.5 to about 8.5.

Typically, the amount of peroxide consumed in primary bleach tower 30 will be somewhat lower than in the case where sodium hydroxide is used as the source of alkalinity. However, the amount of hydrogen peroxide in the inlet to primary bleach tower 30 should be carefully controlled so that the amount of hydrogen peroxide in the outlet from primary bleach tower 30 is suitably from about 0.1 to about 3%, preferably from about 0.25 to about 2% and more preferably from about 0.5 to about 1.0%. Prior to entry into residual bleach tower 32, the pulp carrying a substantial amount of entrained hydrogen peroxide is mixed with peroxide activating agent as previously described in medium consistency mixing pump 34. Preferably the amount of peroxide activating agent is sufficient to ensure that the bulk, if not all, of the entrained hydrogen peroxide is converted in situ to peracetic acid which yield perhydroxyl ions which are ultimately converted to active oxygen as previously mentioned.

Peroxide activating agent is introduced into the stream leaving primary bleach tower 30 at medium consistency mixing pump 34, the amount and nature being carefully matched to the residual hydrogen peroxide contained therein, the goal being to achieve substantially complete consumption of the expensive hydrogen peroxide in residual bleach tower 32. Pulp flows upwardly through residual bleach tower 32 which is sized to provide a residence time of from about 30 to about 240 minutes, preferably from about 45 to about 210 minutes and more preferably from about 60 to about 120 minutes. Inlet temperature to residual bleach tower 32 is suitably from about 60° C. (140° F.) to about 88° C. (190° F.), preferably between about 68° C. (155° F.) and about 85° C. (185° F.) and more preferably between about 77° C. (170° F.) and about 82° C. (180° F.) while the outlet temperature is suitably about the same. As mentioned previously, a rise of temperature during an oxidative bleach stage of 0.5 to 3° C. (~1-5° F.) would not be exceptional.

To avoid waste of expensive bleaching chemicals, the pulp stream exiting residual bleach tower 32 should be washed thoroughly in washer 36 to remove those residua of the oxidative bleaching process which would interfere with subsequent reductive bleaching. After washing, the pulp is mixed with steam in steam mixer 38 and more thoroughly mixed as it passes through medium consistency mixing pump 40 to low consistency mixing pump 42 wherein it suitably mixed with a reductive bleaching agent such as sodium hydrosulfite, the admixture entering reductive bleach tower 44 being at an entrance temperature which is suitably from about 71° C. (160° F.) to about 100° C. (212° F.), preferably between about 77° C. (170° F.) and about 100° C. (212° F.) and more preferably between about 82° C. (180° F.) and about 100° C. (212° F.) while the outlet temperature is only very slightly, perhaps as little as 0.5° C. (~1° F.) to 5° C. (10° F.), lower. Reductive bleach tower 44 is suitably sized to provide a residence time of from about 30 minutes to about 240 minutes, preferably from about 45 to about 180 minutes and more preferably from about 60 to about 120 minutes. The final pulp is usually washed at least one more time before it is passed to the paper machine.

The process of the present invention is advantageously operated with a mixed chemical and high yield pulp having a brightness of between about 50 and 70, preferably between 55 and 65, which is rather lower than the brightness of unbleached/unbrightened recycle pulps used to make premium and near premium quality tissues and towel product which is most usually at least about 80 and often at least about 82. The target brightness of pulp leaving residual bleach tower 32 is typically between about 70 and 80 which is also rather lower than would be expected of a typical recycle pulp for premium and near premium towel and tissue products prior to reductive bleaching. However, it is desirable to employ slightly more aggressive reductive bleaching than normal to bring the final brightness of the pulp up to from about 80 to about 85, preferably at least about 81, more preferably at least about 82 and most preferably at least about 83. Accordingly, it can be appreciated that considerable savings can be realized by beginning with lower brightness recycle pulp, using milder oxidative bleaching steps which do less damage to the pulp and thus introduce less trash and scale to the paper machine and then achieve final brightness in the reductive bleaching stages which will be operated at higher concentrations of bleaching chemicals, higher temperatures and longer residence times than are typical.

| | Option 1 | | | |
| --- | --- | --- | --- | --- |
| | suitable | preferable | More preferable | Most preferable |
| Inlet pulp consistency (%) | 10-20 | 12-19 | 13-18 | 14-18 |
| Mg(OH)$_2$ addition rate (%) | 0.1-2 | | | 0.4-0.8 |
| Temperature of pulp upon H$_2$O$_2$ addition (° C./° F.) | 60-100 (140-212) | 71-100 (160-212) | 77-99 (170-210) | 82-93 (180-200) |
| H$_2$O$_2$ addition rate (%) | 0.1-5 | 0.5-3.5 | 0.75-2.5 | 1-2 |
| O$_2$ concentration at entrance to primary bleach tower (%) | 0.1-1 | 0.15-0.8 | 0.2-0.65 | 0.25-0.50 |
| pH at entrance to primary bleach tower | 7-10 | 7.5-9.75 | 8-9.5 | 8.5-9.5 |
| Residence time in primary bleach tower (minutes) | 30-240 | 60-210 | 90-200 | 120-180 |
| Identity of Peroxide Activating Agent | TAED or Acetic Anhydride | | | |
| Peroxide Concentration leaving Primary Bleach tower (%) | 0.1-3 | 0.2-2.5 | 0.35-0.75 | 0.5-1 |
| pH at exit to primary bleach tower | 7-10.0 | 7.5-9.75 | 8.0-9.5 | 8.5-9.5 |
| Peroxide Activating Agent addition rate (%) | 0.01-1.0 | 0.015-0.50 | 0.025-0.25 | 0.05-0.10 |
| Residence time in Residual bleach tower (minutes) | 30-240 | 45-210 | 45-180 | 60-120 |
| Temperature entering Residual bleach tower (° C./° F.) | 60-88 (140-190) | 66-85 (150-185) | 71-82 (160-180) | 77-82 (170-180) |
| pH at exit to residual bleach tower | 7-9 | 7.2-8.8 | 7.35-8.65 | 7.5-8.5 |
| Inlet pulp Temperature for Reductive Bleach Tower (° C./° F.) | 71-100 (160-212) | 74-100 (165-212) | 77-100 (170-212) | 82-100 (180-212) |

-continued

Option 1

| | suitable | preferable | More preferable | Most preferable |
|---|---|---|---|---|
| Hydrosulfite addition rate (%) | 0.1-1.0 | 0.15-0.75 | 0.2-0.6 | 0.25-0.50 |
| Reductive Retention Time | | 10 sec-30 min | | |

Figure 3:
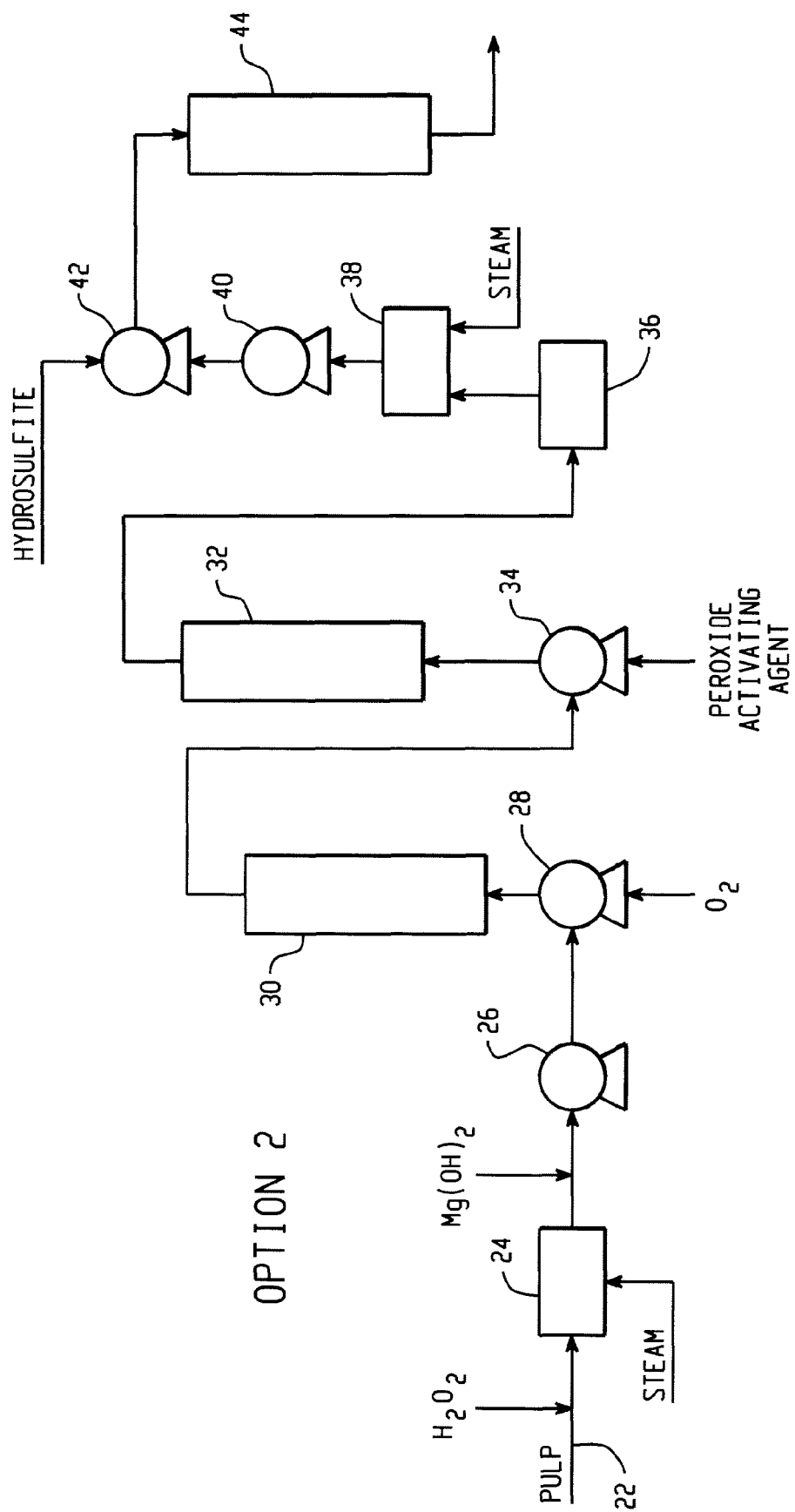

FIG. 3 illustrates the flow diagram for carrying out Option 2 in which medium consistency pulp enters through feed line 22, mixing therein with hydrogen peroxide entering feed line 22 prior to steam mixer 24 wherein the pulp and hydrogen peroxide admixture are heated to a temperature of between about 60° C. (140° F.) and about 100° C. (212° F.), preferably between about 71° C. (160° F.) and about 99° C. (210° F.), more preferably between 82° C. (180° F.) and about 93° C. (200° F.), while the hydrogen peroxide is thoroughly mixed with the pulp in steam mixer 24 which may be either of the type in which steam is injected into a flowing stream of pulp and mixing occurs by virtue of the shear created as the pulp flows or of the tank type where steam is injected into a stirred tank. After the pulp is thoroughly mixed with hydrogen peroxide, magnesium hydroxide is added prior to the inlet to medium consistency mixing pump 26. Molecular oxygen ($O_2$) is added to the admixture of pulp, magnesium hydroxide and hydrogen peroxide at the suction inlet to medium consistency mixing pump 28 which impels the mixture to primary bleach tower 30. Preferably, commercially pure oxygen is used although any oxygen enriched stream or even atmospheric air may be used but the ultimate goal is preferably to completely saturate the admixture with oxygen and this is far more easily accomplished with relatively pure gaseous oxygen. It is not necessary to achieve complete saturation to achieve substantial benefits from injection of a stream carrying oxygen.

Pulp flows upwardly through primary bleach tower 30 which is sized to provide a residence time of from about 30 to about 240 minutes, preferably from about 60 to about 210 minutes and more preferably from about 120 to about 180 minutes. Inlet temperature to primary bleach tower 30 is suitably from about 60° C. (140° F.) to about 100° C. (212° F.), preferably between about 71° C. (160° F.) and about 99° C. (210° F.), and more preferably between about 82° C. (180° F.) and about 93° C. (200° F.), while the outlet temperature will vary from only slightly lower, perhaps as little as 3° C. (5° F.), lower, than the inlet temperature down to about 60° C. (140° F.). As mentioned, a rise of 0.5 to 3° C. (~1-5° F.), would not be considered exceptional. The residence time in primary bleach tower 30 is typically somewhat longer than would be the case where sodium hydroxide might be used as the source of alkalinity; however the damage to fibers is greatly reduced resulting in greatly reduced generation of fines and anionic trash. Preferably, the pulp is not washed between primary bleach tower 30 and residual bleach tower 32 as it is far more effective to leave unreacted hydrogen peroxide in place to be converted to peracetic acid in situ in residual bleach tower 32.

Typically, the inlet concentration of hydrogen peroxide to primary bleach tower 30 will be between about 0.1% and 5%, preferably between about 0.5% and 3.5%, more preferably between about 1% and about 2%, while the concentration of magnesium hydroxide will be between about 0.1 and about 2, preferably between about 0.25% and 1%, more preferably between about 0.4% and about 0.8%. Desirably inlet concentration of oxygen to primary bleach tower 30 will be between about 0.1 and 1.0%, preferably between about 0.15 and 0.75%, more preferably between about 0.25 and about 0.5%. Entry pH is from about 7 to 10.0, preferably from about 8 to about 9.75, more preferably from about 8.5 to about 9.5, while pH at the exit to primary bleach tower 30 is from about 7 to about 10, preferably from about 8 to about 9.75, more preferably from about 8.5 to about 9.5.

However, the amount of hydrogen peroxide in the inlet to primary bleach tower 30 should be carefully controlled so that the amount of hydrogen peroxide in the outlet from primary bleach tower 30 is suitably from about 0.1 to about 3, preferably from about 0.25 to about 2.0 and more preferably from about 0.5 to about 1.0. Prior to entry into residual bleach tower 32, the pulp carrying a substantial amount of entrained hydrogen peroxide is mixed with peroxide activating agent as previously described in medium consistency mixing pump 34. Preferably the amount of peroxide activating agent is sufficient to ensure that the bulk, if not all, of the entrained hydrogen peroxide is converted in situ to peracetic acid which yields perhydroxyl ions which are ultimately converted to active oxygen as previously mentioned. Suitably the amount of peroxide activating agent will be from about 0.01% to about 1.0% based on the weight of the pulp. The amount of peroxide activating agent is preferably from about 0.015% to about 0.50%, more preferably from about 0.025% to about 0.25% and most preferably from about 0.05% to 0.10% of the dry weight of the pulp to be treated.

Peroxide activating agent is introduced into the stream leaving primary bleach tower 30 at medium consistency mixing pump 34, the amount and nature being carefully matched to the residual hydrogen peroxide contained therein, the goal being to achieve substantially complete consumption of the expensive hydrogen peroxide in residual bleach tower 32. Pulp flows upwardly through residual bleach tower 32 which is sized to provide a residence time of from about 30 to about 240 minutes, preferably from about 45 to about 210 minutes and more preferably from about 60 to about 120 minutes. Inlet temperature to residual bleach tower 32 is suitably from about 60° C. (140° F.) to about 88° C. (190° F.), preferably between about 68° C. (155° F.) and about 85° C. (185° F.) and more preferably between about 77° C. (170° F.) and about 82° C. (180° F.) while the outlet temperature varies from only slightly lower, perhaps as little as 3° C. (5° F.) lower, down to 60° C. (140° F.), but possibly increasing slightly—sometimes by from about 0.5 to 3° C. (1-5° F.).

To avoid waste of expensive bleaching chemicals, the pulp stream exiting residual bleach tower 32 should be washed thoroughly in washer 36 to remove those residua of the oxidative bleaching process which would interfere with subsequent reductive bleaching. After washing, the pulp is mixed with steam in steam mixer 38 and more thoroughly mixed as it passes through medium consistency mixing pump 40 to low consistency mixing pump 42 wherein it suitably mixed with a reductive bleaching agent such as sodium hydrosulfite, the admixture entering reductive bleach tower 44 being at an entrance temperature which is suitably from about 60° C. (140° F.) to about 88° C. (190° F.), preferably between about 66° C. (150° F.) and about 85° C. (185° F.) and more preferably between about 77° C. (170° F.) and about 82° C. (180° F.) while the outlet temperature is suitably only very slightly, perhaps as little as 0.5 to 5° C. (~1-10° F.) lower, but possibly from 0.5 to 3° C. (~1-5° F.) higher. Reductive bleach tower 44 is suitably sized to provide a residence time of from about 30 minutes to about 240 minutes, preferably from about 45 to about 180 minutes and more preferably from about 60 to about 120 minutes. The final pulp is usually washed at least one more time before it is passed to the paper machine.

The process of the present invention is advantageously operated with a mixed chemical and high yield pulp having a brightness of between about 50 and 70, preferably between about 55 and 65 which is rather lower than the brightness of unbleached/unbrightened recycle pulps used to make premium and near premium quality tissues and towel product which is most usually at least about 80 and often at least about 82. The target brightness of pulp leaving residual bleach tower is typically between about 70 and 80 which is also rather lower than would be expected of a typical recycle pulp for premium and near premium towel and tissue products prior to reductive bleaching. However, it is desirable to employ slightly more aggressive reductive bleaching than normal to bring the final brightness of the pulp up to from about 80 to about 85, preferably at least about 81, more preferably at least about 82 and most preferably at least about 83. Accordingly, it can be appreciated that considerable savings can be realized by beginning with lower brightness recycle pulp, using milder oxidative bleaching steps which do less damage to the pulp and thus introduce less trash and scale to the paper machine and then achieve final brightness in the reductive bleaching stages which will be operated at higher concentrations of bleaching chemicals, higher temperatures and longer residence times than are typical.

| | Option 2 | | | |
|---|---|---|---|---|
| | suitable | preferable | More preferable | Most preferable |
| Inlet pulp consistency (%) | 10-20 | 11-19 | 12-18 | 14-18 |
| $H_2O_2$ addition rate (%) | 0.1-5.0 | 0.25-3.5 | 0.5-2.5 | 1-2% |
| Temperature of pulp upon $Mg(OH)_2$ Addition (° C./° F.) | 60-100 (140-212) | 68-99 (155-210) | 74-96 (165-205) | 82-93 (180-200) |
| $Mg(OH)_2$ addition rate (%) | 0.1-2.0 | 0.2-1.5 | 0.3-1.0 | 0.4-0.8 |
| $O_2$ concentration at entrance to primary bleach tower (%) | 0.1-1 | 0.15-0.8 | 0.2-0.75 | 0.25-0.50 |
| pH at entry to primary bleach tower | 7-10.0 | 7.5-9.75 | 8.0-9.0 | 8.5-9.5 |
| Residence time in primary bleach tower (minutes) | 30-240 | 45-210 | 60-180 | 120-180 |
| Peroxide Concentration leaving Primary Bleach tower (%) | 0.1-3.0 | 0.2-2.5 | 0.3-2.0 | 0.5-1.0 |
| pH at exit to primary bleach tower | 7-10.0 | 7.5-9.75 | 8-9.5 | 8.5-9.5 |
| Identity of Peroxide Activating Agent | | TAED or Acetic Anhydride | | |
| Peroxide Activating Agent addition rate (%) | 0.01-1.0 | 0.015-0.50 | 0.025-0.25 | 0.05-0.10 |

-continued

| | Option 2 | | | |
|---|---|---|---|---|
| | suitable | preferable | More preferable | Most preferable |
| Residence time in Residual bleach tower (minutes) | 30-240 | 45-210 | 60-180 | 60-120 |
| pH at exit to residual bleach tower | 7-9 | 7.2-8.8 | 7.3-8.7 | 7.5-8.5 |
| Temperature entering Residual bleach Tower (° C./° F.) | 60-88 (140-190) | 68-85 (155-185) | 71-82 (160-180) | 77-82 (170-180) |
| Inlet pulp consistency for Reductive Bleach Tower (%) | | 10-30 | | |
| Inlet pulp Temperature for Reductive Bleach Tower (° C./° F.) | 71-100 (160-212) | 74-100 (165-212) | 77-100 (170-212) | 82-100 (180-212) |
| Hydrosulfite addition rate (%) | 0.1-1.0 | 0.15-0.8 | 0.2-0.75 | 0.25-0.5 |
| Retention time in reductive bleach tower (minutes) | | 0.1-30 | | |

Figure 4:
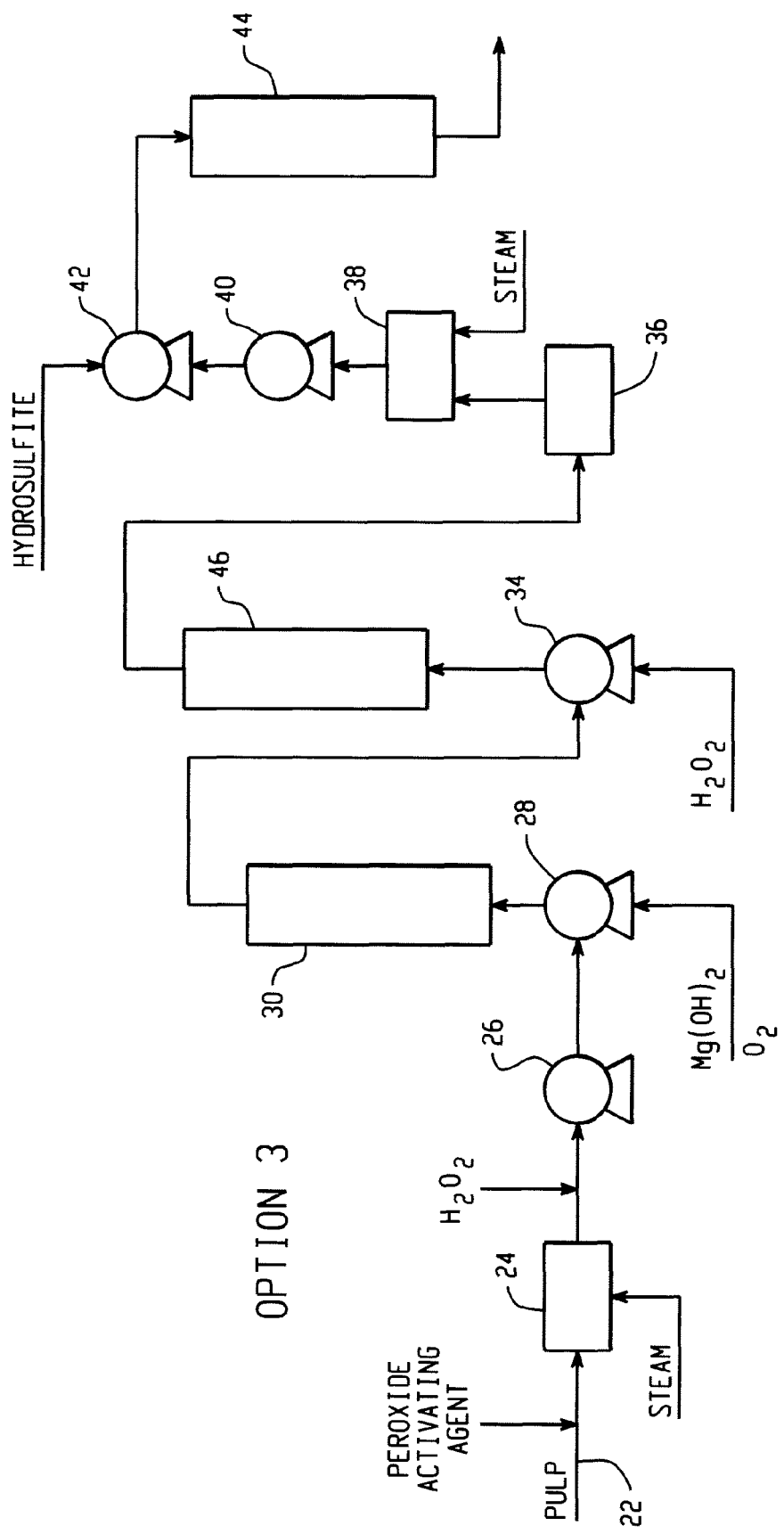

FIG. 4 illustrates the flow diagram for Option 3, in which medium consistency pulp enters through feed line 22, mixing therein with peroxide activating agent entering feed line 22 prior to steam mixer 24 wherein the pulp and peroxide activating agent admixture are heated to a temperature of between about 60° C. (140° F.) and about 100° C. (212° F.), preferably between about 63° C. (145° F.) and about 93° C. (200° F.), more preferably between 66° C. (150° F.) and about 82° C. (180° F.) while the peroxide activating agent is thoroughly mixed with the pulp in steam mixer 24 which may be either of the type in which steam is injected into a flowing stream of pulp and mixing occurs by virtue of the shear created as the pulp flows or of the tank type where steam is injected into a stirred tank. After the pulp is thoroughly mixed with peroxide activating agent, hydrogen peroxide is added prior to the inlet to medium consistency mixing pump 26. Molecular oxygen ($O_2$) and magnesium hydroxide are added to the admixture of pulp, peroxide activating agent and hydrogen peroxide at the suction inlet to medium consistency mixing pump 28 which impels the mixture to primary bleach tower 30. Preferably, commercially pure oxygen is used although any oxygen enriched stream or even atmospheric air may be used but the ultimate goal is preferably to completely saturate the admixture with oxygen and this is far more easily accomplished with relatively pure gaseous oxygen. It is not necessary to achieve complete saturation to achieve substantial benefits from injection of a stream carrying oxygen.

Pulp flows upwardly through primary bleach tower 30 which is sized to provide a residence time of from about 30 to about 180 minutes, preferably from about 45 to about 120 minutes and more preferably from about 30 to about 90 minutes. Inlet temperature to primary bleach tower 30 is suitably from about 60° C. (140° F.) and about 100° C. (212° F.), preferably between about 63° C. (145° F.) and about 93° C. (200° F.) and more preferably between about 66° C. (150° F.) and about 82° C. (180° F.) while the outlet temperature may vary from only slightly lower than the inlet temperature, perhaps some 3° C. (5° F.) lower, down to about 60° C. (140° F.), with a slight increase being possible. The residence time in primary bleach tower 30 is typically somewhat longer than would be the case where sodium hydroxide might be used as the source of alkalinity; however the damage to fibers is greatly reduced resulting in greatly reduced generation of fines and anionic trash. Preferably, the pulp is not washed between primary bleach tower 30 and secondary bleach tower 46 as it is far more effective to leave unreacted hydrogen peroxide in place to be converted to peracetic acid in situ in secondary bleach tower 46. Typically the inlet concentration of hydrogen peroxide to primary bleach tower 30 will be between about 0.1% and 5.0%, preferably between about 0.35% and 2.5%, more preferably between about 0.75% and about 1.25%, while the concentration of magnesium hydroxide will be between about 0.1% and about 2.0%, preferably between about 0.25% and 1.5%, more preferably between about 0.4% and about 0.8%. Desirably inlet concentration of oxygen to primary bleach tower 30 will be between about 0.1% and 1.0%, preferably between about 0.15% and 0.75%, more preferably between about 0.25% and about 0.5%. Entry pH is from about 7 to 9, preferably from about 7.25 to about 8.75, more preferably from about 7.5 to about 8.5, while pH at the exit to primary bleach tower 30 is from about 7 to about 9, preferably from about 7.25 to about 8.75, more preferably from about 7.5 to about 8.5.

However, in the practice of Option 3, the amount of hydrogen peroxide in the inlet to primary bleach tower 30 need not be as carefully controlled as in the Options 1 and 2 as additional hydrogen peroxide is introduced through mixing pump 34 so that the amount of hydrogen peroxide in the inlet to secondary bleach tower 46 is suitably from about 0.1% to about 3.0%, preferably from about 0.5% to about 2.5% and more preferably from about 1% to about 2%.

Hydrogen peroxide is introduced into the stream leaving primary bleach tower 30 at medium consistency mixing pump 34, the goal being to achieve substantially complete consumption of the expensive hydrogen peroxide in secondary bleach tower 46. Pulp flows upwardly through secondary bleach tower 46 which is sized to provide a residence time of from about 60 to about 240 minutes, preferably from about 90 to about 210 minutes and more preferably from about 120 to about 180 minutes. Inlet temperature to secondary bleach tower 46 is suitably from about 60° C. (140° F.) to about 93° C. (200° F.), preferably between about 71° C. (160° F.) and about 91° C. (195° F.) and more preferably between about 82° C. (180° F.) and about 88° C. (190° F.) while the outlet temperature may vary between only slightly less than the inlet temperature, perhaps 3° C. (5° F.) less, down to 60° C. (140° F.) with a slight increase being possible.

To avoid waste of expensive bleaching chemicals, the pulp stream exiting secondary bleach tower 46 should be washed thoroughly in washer 36 to remove those residua of the oxidative bleaching process which would interfere with subsequent reductive bleaching. After washing, the pulp is mixed with steam in steam mixer 38 and more thoroughly mixed as it passes through medium consistency mixing pump 40 to low consistency mixing pump 42 wherein it suitably mixed with a reductive bleaching agent such as sodium hydrosulfite, the admixture entering reductive bleach tower 44 being at an entrance temperature which is suitably from about 71° C. (160° F.) to about 100° C. (212° F.), preferably between about 77° C. (170° F.) and about 100° C. (212° F.) and more preferably between about 82° C. (180° F.) and about 100° C. (212° F.), while the outlet temperature is suitably only very slightly, perhaps as little as 0.5° C. to 5° C. (~1-10° F.), lower. Reductive bleach tower 44 is suitably sized to provide a residence time of from about 5 seconds to about 30 minutes, preferably from about 30 seconds to about 20 minutes and more preferably from about 1 minute to about 15 minutes, the amount of time varying widely within this range depending largely upon temperature and concentration. Very short residence times are often quite suitable with temperatures nearer to 100° C. (212° F.) at high concentration of reductive bleaches and high consistency. The final pulp is usually washed at least one more time before it is passed to the paper machine.

| | Option 3 | | | |
|---|---|---|---|---|
| | suitable | preferable | More preferable | Most preferable |
| Inlet pulp consistency (%) | 10-22 | 12-20 | 13-19 | 14-18 |
| Identity of Peroxide Activating Agent | | TAED or Acetic Anhydride | | |
| Peroxide Activating Agent addition rate (%) | 0.01-1.0 | 0.015-0.50 | 0.025-0.25 | 0.05-0.10 |
| Temperature of pulp upon $H_2O_2$ addition (° C./° F.) | 60-100 (140-212) | 63-93 (145-200) | 66-88 (150-190) | 66-82 (150-180) |
| $H_2O_2$ addition rate (% of OD Pulp Wt) | 0.1-5.0 | 0.15-3.5 | 0.5-2.0 | 0.75-1.25 |
| $O_2$ concentration at entrance to primary bleach tower (%) | 0.1-1 | 0.15-0.8 | 0.2-0.75 | 0.25-0.50 |
| pH at entry to primary bleach tower | 7-10 | 7-9.5 | 7-9 | 7.5-8.5 |
| Mg(OH)$_2$ Addition Rate (%) | 0.1-2.0 | 0.15-1.5 | 0.25-1.0 | 0.4-0.8 |
| Residence time in primary bleach tower (minutes) | 20-180 | 25-150 | 30-120 | 30-90 |
| pH at exit to primary bleach tower | 7-10 | 7.25-9.5 | 7.25-9.0 | 7.5-8.5 |
| Peroxide Concentration leaving Primary Bleach tower (%) | 0.1-3.0 | 0.2-2.5 | 0.3-2.0 | 0.5-1.0 |
| $H_2O_2$ addition rate for Residual Bleach Tower (%) | 0.1-3.0 | 0.25-2.5 | 0.5-2.25 | 1-2 |
| Residence time in Residual bleach Tower (minutes) | 60-240 | 90-210 | 90-180 | 120-180 |
| pH at exit to residual bleach tower | 7-10 | 7-9.5 | 7.5-9 | 7.5-8.5 |
| Temperature entering Secondary bleach tower (° C./° F.) | 60-88 (140-190) | 63-85 (145-185) | 64-83 (147-181) | 66-82 (150-180) |
| Inlet pulp consistency for Reductive Bleach Tower (%) | | 10-30 | | |
| Inlet pulp Temperature for Reductive Bleach Tower (° C./° F.) | 71-100 (160-212) | 77-100 (170-212) | 80-100 (175-212) | 82-100 (180-212) |
| Hydrosulfite addition rate (%) | 0.1-1.0 | 0.15-0.8 | 0.25-0.75 | 0.25-0.50 |
| Retention time in reductive bleach tower (minutes) | | 0.1-30 | | |

Figure 5:
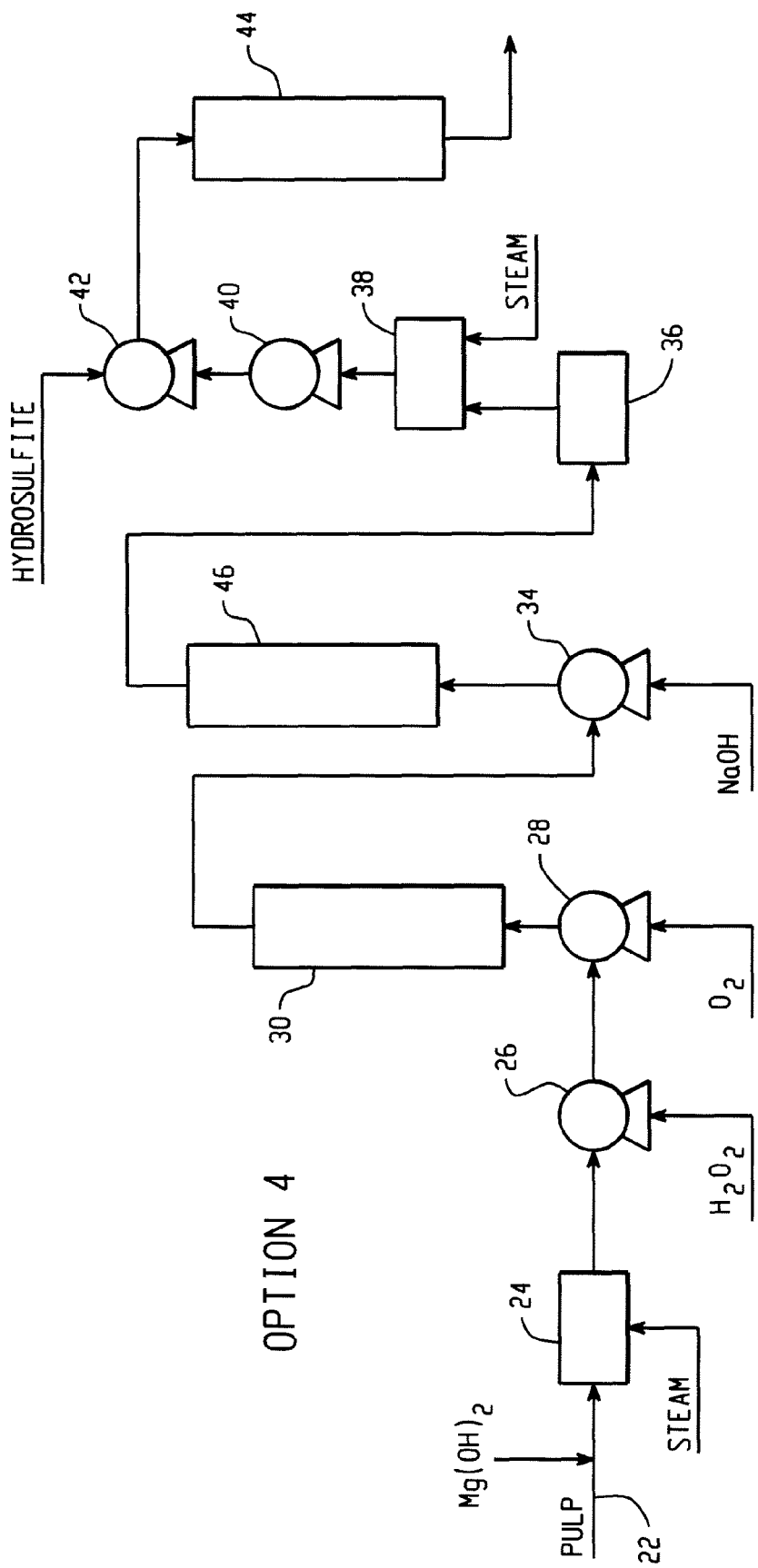

FIG. 5 illustrates the flow diagram for Option 4, in which medium consistency pulp enters through feed line 22, mixing therein with Mg(OH)$_2$ entering feed line 22 prior to steam mixer 24 wherein the pulp and Mg(OH)$_2$ admixture are heated to a temperature of between about 60° C. (140° F.) and about 100° C. (212° F.), preferably between about 63° C. (145° F.) and about 96° C. (200° F.), more preferably between 66° C. (150° F.) and about 82° C. (180° F.) while the $Mg(OH)_2$ is thoroughly mixed with the pulp in steam mixer 24 which may be either of the type in which steam is injected into a flowing stream of pulp and mixing occurs by virtue of the shear created as the pulp flows or of the tank type where steam is injected into a stirred tank. After the pulp is thoroughly mixed with $Mg(OH)_2$, hydrogen peroxide is added prior to the inlet to medium consistency mixing pump 26. Molecular oxygen ($O_2$) may also be added to the admixture of pulp and hydrogen peroxide at the suction inlet to medium consistency mixing pump 28 which impels the mixture to primary bleach tower 30. Preferably, commercially pure oxygen is used although any oxygen enriched stream or even atmospheric air may be used but the ultimate goal is preferably to completely saturate the admixture with oxygen and this is far more easily accomplished with relatively pure gaseous oxygen. It is not necessary to achieve complete saturation to achieve substantial benefits from injection of a stream carrying oxygen.

Pulp flows upwardly through primary bleach tower 30 which is sized to provide a residence time of from about 30 to about 240 minutes, preferably from about 45 to about 120 minutes and more preferably from about 30 to about 90 minutes. Inlet temperature to primary bleach tower 30 is suitably from about 60° C. (140° F.) to about 100° C. (212° F.), preferably between about 63° C. (145° F.) and about 96° C. (200° F.) and more preferably between about 68° C. (150° F.) and about 82° C. (180° F.) while the outlet temperature may vary from only slightly lower than the inlet temperature, perhaps some 3° C. (5° F.) lower, down to about 60° C. (140° F.) with a slight increase being possible. The residence time in primary bleach tower 30 is typically somewhat longer than would be the case where sodium hydroxide might be used as the source of alkalinity; however the damage to fibers is greatly reduced resulting in greatly reduced generation of fines and anionic trash. Preferably, the pulp is not washed between primary bleach tower 30 and secondary bleach tower 46 as it is far more effective to leave unreacted hydrogen peroxide in place to be converted to peracetic acid in situ in secondary bleach tower 46. Typically the inlet concentration of hydrogen peroxide to primary bleach tower 30 will be between about 0.1% and 5.0%, preferably between about 0.35% and 2.5%, more preferably between about 0.75% and about 1.25%, while the concentration of sodium hydroxide will be between about 0.1% and about 2.0%, preferably between about 0.25% and 1.5%, more preferably between about 0.4% and about 0.8%. Desirably, inlet concentration of oxygen to primary bleach tower 30 will be between about 0.1% and 1.0%, preferably between about 0.15% and 0.75%, more preferably between about 0.25% and about 0.5%. Entry pH is from about 7 to 9, preferably from about 7.25 to about 8.75, more preferably from about 7.5 to about 8.5, while pH at the exit to primary bleach tower 30 is from about 7 to about 9, preferably from about 7.25 to about 8.75, more preferably from about 7.5 to about 8.5.

Typically, the amount of peroxide consumed in primary bleach tower 30 will be somewhat lower than in the case where sodium hydroxide is used as the source of alkalinity. However, the amount of hydrogen peroxide in the inlet to primary bleach tower 30 should be carefully controlled so that the amount of hydrogen peroxide in the outlet from primary bleach tower 30 is suitably from about 0.1% to about 3%, preferably from about 0.25% to about 2% and more preferably from about 0.5% to about 1.0%, all based on the weight of oven dry pulp. Prior to entry into secondary bleach tower 46, the pulp carrying a substantial amount of entrained hydrogen peroxide is mixed with a carefully controlled amount of sodium hydroxide as previously described in medium consistency mixing pump 34. Preferably the amount of sodium hydroxide is just sufficient to ensure that the bulk, if not all, of the entrained hydrogen peroxide is converted in situ to perhydroxyl ions which are ultimately converted to active oxygen as previously mentioned.

Sodium hydroxide is introduced into the stream leaving primary bleach tower 30 at medium consistency mixing pulp 34, the amount being carefully matched to the residual hydrogen peroxide contained therein, the goal being to achieve substantially complete consumption of the expensive hydrogen peroxide in secondary bleach tower 46 without degrading the fiber either by generation of anionic trash or darkening the pulp due to excessive alkalinity. The pH of the stream entering secondary bleach tower 46 is suitably no lower than 8, preferably between about 8.5 and 10.0, more preferably between 9 and 10. Pulp flows upwardly through secondary bleach tower 46 which is sized to provide a residence time of from about 30 to about 180 minutes, preferably from about 45 to about 150 minutes and more preferably from about 60 to about 120 minutes. Inlet temperature to secondary bleach tower 46 is suitably from about 60° C. (140° F.) and about 96° C. (200° F.), preferably between about 71° C. (160° F.) and about 91° C. (195° F.) and more preferably between about 82° C. (180° F.) and about 88° C. (190° F.) while the outlet temperature may range from only slightly less than the inlet temperature, perhaps 3° C. (5° F.) less, down to as low as 60° C. (140° F.), the possible slight temperature increase being perhaps lightly greater due to the action of sodium hydroxide.

To avoid waste of expensive bleaching chemicals, the pulp stream exiting secondary bleach tower 46 should be washed thoroughly in washer 36 to remove those residua of the oxidative bleaching process which would interfere with subsequent reductive bleaching. After washing, the pulp is mixed with steam in steam mixer 38 and more thoroughly mixed as it passes through medium consistency mixing pump 40 to low consistency mixing pump 42 wherein it suitably mixed with a reductive bleaching agent such as sodium hydrosulfite, the admixture entering reductive bleach tower 44 being at an entrance temperature which is suitably from about 71° C. (160° F.) and about 100° C. (212° F.), preferably between about 77° C. (170° F.) and about 100° C. (212° F.), and more preferably between about 82° C. (180° F.) and about 100° C. (212° F.), while the outlet temperature is suitably only very slightly, perhaps as little as 0.5° C. to 5° C. (~1-10° F.), lower. Reductive bleach tower 44 is suitably sized to provide a residence time of from about 30 minutes to about 240 minutes, preferably from about 45 to about 180 minutes and more preferably from about 60 to about 120 minutes. The final pulp is usually washed at least one more time before it is passed to the paper machine.

The process of the present invention is advantageously operated with a mixed chemical and high yield pulp having a brightness of between about 50 and 70, preferably between about 55 and 65 which is rather lower than the brightness of unbleached/unbrightened recycle pulps used to make premium and near premium quality tissues and towel product which is most usually at least about 80 and often at least about 82. The target brightness of pulp leaving residual bleach tower is typically between about 70 and 80 which is also rather lower than would be expected of a typical recycle pulp for premium and near premium towel and tissue products prior to reductive bleaching. However, it is desirable to employ slightly more aggressive reductive bleaching than normal to bring the final brightness of the pulp up to from about 80 to about 85, preferably at least about 81, and more preferably at least about 82. Accordingly, it can be appreciated that considerable savings can be realized by beginning with lower brightness recycle pulp, using milder oxidative bleaching steps which do less damage to the pulp and thus introduce less trash and scale to the paper machine and then achieve final brightness in the reductive bleaching stages which will be operated at higher concentrations of bleaching chemicals, higher temperatures and longer residence times than are typical.

| | Option 4 | | | |
|---|---|---|---|---|
| | suitable | preferable | More preferable | Most preferable |
| Inlet pulp consistency (%) | 10-20 | 12-19 | 13-18 | 14-18 |
| $Mg(OH)_2$ addition rate (%) | 0.1-2 | | | 0.2-0.4 |
| Temperature of pulp upon $H_2O_2$ addition (° C./° F.) | 60-100 (140-212) | 71-96 (160-205) | 77-93 (170-200) | 82-93 (180-200) |
| $H_2O_2$ addition rate (%) | 0.1-5.0 | 0.15-3.5 | 0.5-2.5 | 1-2 |
| $O_2$ concentration at entrance to primary bleach tower (%) | 0.1-1.0 | 0.15-0.85 | 0.20-0.75 | 0.25-0.5 |
| pH at entrance to primary bleach tower | 7-10 | 7.5-9.75 | 8.0 9.5 | 8.5-9.5 |
| Residence time in primary bleach tower | 30-240 | 45-210 | 60-210 | 120-180 |
| Peroxide Concentration leaving Primary Bleach tower (%) | 0.1-3.0 | 0.15-2.5 | 0.25-2.0 | 0.5-1.0 |
| pH at exit to primary bleach tower. | 7-10 | 7.5-9.5 | 7.5-9 | 8-9 |
| NaOH addition rate for Secondary Bleach Tower (%) | 0.25-0.50 | | | |
| pH at entry to Secondary Bleach Tower | 7-10 | 7.5-9.5 | 7.5-9 | 8-9 |
| Residence time in Secondary bleach tower (minutes) | 30-180 | 45-150 | 60-150 | 60-120 |
| Temperature entering Secondary bleach tower (° C./° F.) | 60-93 (140-200) | 71-91 (160-195) | 77-88 (170-190) | 82-88 (180-190) |
| Inlet pulp consistency for Reductive Bleach Tower (%) | 10-30 | | | |
| Inlet pulp Temperature for Reductive Bleach Tower (° C./° F.) | 71-100 (160-212) | 77-100 (170-212) | 80-100 (175-212) | 82-100 (180-212) |
| Hydrosulfite addition rate (%) | 0.1-1.0 | 0.25-0.75 | 0.3-0.6 | 0.25-0.5 |
| Retention time in reductive bleach tower (minutes) | 01-30 | | | |

The process of the present invention can also be advantageously operated with a mixed chemical and high yield pulp having a brightness of between about 45 and 75, preferably between 50 and 70, more preferably between about 55 and 65 which is rather lower than the brightness of unbleached/unbrightened recycle pulps used to make premium and near premium quality tissues and towel product which is most usually at least about 80 to 82 and often at least about 85. The target brightness of pulp leaving residual bleach tower is typically between about 70 and 80 which is also rather lower than would be expected of a typical recycle pulp for premium and near premium towel and tissue products prior to reductive bleaching. However, it is desirable to employ slightly more aggressive reductive bleaching than normal to bring the final brightness of the pulp up to from about 80 to about 82, preferably at least about 83, more preferably at least about 84 and most preferably at least about 85. Accordingly, it can be appreciated that considerable savings can be realized by beginning with lower brightness recycle pulp, using milder oxidative bleaching steps wherein not only is the peroxide is utilized more effectively due to the presence of the magnesium ions but which also do less damage to the pulp and thus introduce less trash and scale to the paper machine and then achieve final brightness in the reductive bleaching stages which will be operated at higher concentrations of bleaching chemicals, higher temperatures and longer residence times than are typical.

In many embodiments, $Mg(OH)_2$ is the only alkali source in a multi-stage bleaching sequence, the first stage using hydrogen peroxide and $Mg(OH)_2$, followed by addition of TAED or another peroxide activating agent to the pulp which is believed to form peracetic acid as a result of reaction of TAED with unreacted residual peroxide remaining in the pulp after the alkaline peroxide bleaching step, thereby resulting in further brightening of the pulp. It is believed that use of magnesium hydroxide in the alkaline peroxide bleaching steps often results in a higher residual peroxide level than with more aggressive hydroxides and this residual peroxide is most advantageously used to form peracetic acid in situ in the pulp admixture thereby avoiding troublesome and expensive separation of the bleach liquor from the partially bleached pulp. Only after all of the oxidative bleaching stages are completed is the pulp washed to remove residual oxidative chemical and then reductively bleached at medium consistency. CELLGUARD OP® magnesium hydroxide suspension, from Martin Marietta, is a preferred source of magnesium hydroxide.

In some embodiments, it may be desirable that at least some quantity of the peroxide activating agent be present in the recycled fibers at the time of contact with an alkaline peroxide step. In additional embodiments, it may be desirable that at least some quantity of peroxide activating agent be present in the recycled pulp at the end of the alkaline peroxide step. In one such embodiment, at least about 10% of the peroxide activating agent is present the recycled fibers at the end of the first alkaline peroxide step. This ensures that there is very little wastage of the expensive hydrogen peroxide, which is a major contributor to the cost of the bleaching process—at least at today's pricing.

While the invention has been described in connection with numerous examples and drawings, modifications to those examples and drawings within the spirit and scope of the invention will be readily apparent to those of skill in the art. In view of the foregoing discussion, relevant knowledge in the art and references discussed above in connection with the Background and Detailed Description, the disclosures of which are all incorporated herein by reference in their entireties, further description is deemed unnecessary.

What is claimed is:

1. Multi-stage process for bleaching of a recycle pulp comprising the steps of:
   a) contacting a cellulosic admixture of recycle containing fiber with a magnesium hydroxide generating species chosen from one or more of MgO and $Mg(OH)_2$ in an amount of from about 0.1 to about 2.0% based on the OD weight of the pulp;
   b) contacting the admixture of pulp and $Mg(OH)_2$ with $H_2O_2$ in an amount of from about 0.1 to about 5.0% based on the OD weight of the pulp, while retaining a residual level of $H_2O_2$ in the admixture of at least about 0.1% to about 3%, maintaining said $H_2O_2$ containing mixture at a pH from about 8 to about 9.5 to generate perhydroxyl anions;
   c) thereafter contacting the $H_2O_2$ containing mixture with a peroxide activating agent chosen from one or more of tetraacetylethylenediamine, and acetic anhydride, and thereby generating peracetic acid in-situ; or adding an amount of a perhydroxyl generating agent sufficient to convert substantially all of the residual hydrogen peroxide in the admixture in-situ to perhydroxyl ions; said perhydroxyl generating agent being chosen from one or more of sodium hydroxide, $NA_2CO_3$; and calcium hydroxide;

d) thereafter treating the brightened pulp with a reductive bleaching composition.

2. Multi-stage process for bleaching of a recycle pulp comprising the steps of:
a) providing a fiberized admixture of recycle containing fiber, said pulp having an initial brightness of less than about 65 as measured by ISO 2469/2470;
b) contacting the fiber with a magnesium hydroxide generating species chosen from one or more of MgO and $Mg(OH)_2$ in an amount of from about 0.1 to about 2% based on the OD weight of the pulp;
c) thereafter mixing and heating the admixture of pulp and $Mg(OH)_2$ by contacting it with steam;
d) contacting the admixture of pulp and $Mg(OH)_2$ with $H_2O_2$ in an amount of from about 0.1 to about 5% based on the OD weight of the pulp;
e) allowing the peroxide containing admixture to increase in brightness by at least about 5 points as measured by ISO 2469/2470; while retaining a residual level of $H_2O_2$ in the admixture of at least about 0.1% to about 3%, maintaining said $H_2O_2$ containing mixture at a pH from about 8 to about 9.5 to generate perhydroxyl anions;
f) contacting the $H_2O_2$ containing mixture with a peroxide activating agent chosen from one or more of tetraacetylethylenediamine, acetic anhydride and acetyl chloride and thereby generating peracetic acid in-situ; or adding an amount of a perhydroxyl generating agent sufficient to convert substantially all of the residual hydrogen peroxide in the admixture in-situ to perhydroxyl ions; said perhydroxyl generating agent being chosen from one or more of sodium hydroxide, $NA_2CO_3$; and calcium hydroxide;
g) thereafter treating the brightened pulp with a reductive bleaching composition chosen from one or more of sodium borohydride, sodium bisulfite, sodium hydrosulphite, SFS and FAS and recovering a pulp having a brightness of at least about 75 as measured by ISO 2469/2470.

3. A method of bleaching recycled pulp comprising the steps of:
a) providing an admixture of recycle containing fiber;
b) adding a magnesium hydroxide generating species to said admixture in an amount of from about 0.1 to about 2% by weight based on weight of $Mg(OH)_2$ per weight of dry fiber;

c) heating the admixture to a temperature of between about 50° C. and about 100° C.;
d) adding hydrogen peroxide to said heated admixture in an amount of from about 0.1 to about 5% hydrogen peroxide based on the weight of 100% hydrogen peroxide per weight of dry fiber in said admixture, the mole ratio of hydrogen peroxide to magnesium hydroxide being from about 2 to 1 up to about 4 to 1;
e) retaining the admixture of pulp, hydrogen peroxide and magnesium hydroxide in a temperature range of from about 50° C. to about 100° C. until the residual level of unreacted hydrogen peroxide in the pulp is from about 0.1 to about 2% based on the dry weight of the fiber, maintaining said $H_2O_2$ containing mixture at a pH from about 8 to about 9.5 to generate perhydroxyl anions;
f) adding an amount of a peroxide activating agent sufficient to convert substantially all of the residual hydrogen peroxide in the admixture in-situ to peracetic acid; or adding an amount of a perhydroxyl generating agent sufficient to convert substantially all of the residual hydrogen peroxide in the admixture in-situ to perhydroxyl ions; said perhydroxyl generating agent being chosen from one or more of sodium hydroxide, $NA_2CO_3$; and calcium hydroxide;
g), retaining the admixture at temperature of from at least about 50° C. to about 80° C. for a period sufficient to react at least about 90% of said peracetic acid;
h) thereafter washing and heating the pulp admixture; and
i) subjecting the pulp admixture to a reductive bleaching process.

4. The process of any of claims 1 through 3 wherein the magnesium hydroxide generating species is $Mg(OH)_2$.

5. The process of any of claims 1 through 3 wherein the magnesium hydroxide generating species is MgO.

6. The process of any of claims 1 through 3 wherein the reductive bleaching process comprises treatment with sodium borohydride.

7. The process of any of claims 1 through 3 wherein the cellulosic admixture of recycle containing fiber contains at least about 50% Kraft fiber and no more than about 20% mechanical pulp.

8. The process of any of claims 1 through 3 wherein the cellulosic admixture of recycle containing fiber contains from about 20 to about 80% by weight of Kraft fiber and about 80 to about 20% by weight of lignin containing fiber.

9. The process of any of claims 1 through 3 wherein the admixture of pulp and magnesium hydroxide generating species is contacted with oxygen under gauge pressure of at least about 2 atm before or after the addition of hydrogen peroxide.

10. The process of any of claims 1 through 3 wherein the admixture of pulp and magnesium hydroxide generating species is contacted with $H_2O_2$ in the substantial absence of sodium containing bleaching chemicals.

* * * * *